US011450065B2

United States Patent
McCall

(10) Patent No.: US 11,450,065 B2
(45) Date of Patent: Sep. 20, 2022

(54) METHODS AND SYSTEMS FOR THREE-DIMENSIONAL MODEL SHARING

(71) Applicant: Magic Leap, Inc., Plantation, FL (US)

(72) Inventor: Marc Alan McCall, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 87 days.

(21) Appl. No.: 16/581,716

(22) Filed: Sep. 24, 2019

(65) Prior Publication Data

US 2020/0098173 A1 Mar. 26, 2020

Related U.S. Application Data

(60) Provisional application No. 62/735,675, filed on Sep. 24, 2018.

(51) Int. Cl.
*G06T 17/20* (2006.01)
*G06F 3/01* (2006.01)

(52) U.S. Cl.
CPC ............. *G06T 17/20* (2013.01); *G06F 3/011* (2013.01)

(58) Field of Classification Search
CPC .......... G06F 3/011; G06F 30/00; G06T 17/20; G06T 15/20; G06T 15/04; G06T 19/00
See application file for complete search history.

(56) References Cited

U.S. PATENT DOCUMENTS

| | | | |
|---|---|---|---|
| 7,650,260 B1 * | 1/2010 | Rimoldi | G06F 30/00 703/2 |
| 2012/0130521 A1 * | 5/2012 | Kohlhoff | G06T 19/00 700/98 |

(Continued)

FOREIGN PATENT DOCUMENTS

| | | |
|---|---|---|
| JP | 3059138 B2 | 7/2000 |
| WO | 2014110502 A1 | 7/2014 |

(Continued)

OTHER PUBLICATIONS

International Search Report dated Dec. 13, 2019, for PCT Application No. PCT/US2019/052798, filed Sep. 24, 2019, three pages.
International Search Report dated Dec. 5, 2019, for PCT Application No. PCT/US2019/00046, filed Sep. 24, 2019, three pages.

(Continued)

*Primary Examiner* — Phuc N Doan
(74) *Attorney, Agent, or Firm* — Morrison & Foerster LLP

(57) ABSTRACT

Examples of the disclosure describe systems and methods for decomposing and sharing 3D models. In an example method, a first version of a virtual three-dimensional model is displayed via a display of a wearable head device. A request is made to a host device for data associated with a second version of the virtual three-dimensional model, wherein the second version of the virtual three-dimensional model comprises a constituent part. It is determined whether the first version of the virtual three-dimensional model comprises the constituent part. In accordance with a determination that the first version of the virtual three-dimensional model does not comprise the constituent part, a request is made to the host device for data associated with the constituent part. The second version of the virtual three-dimensional model is displayed, via the display of the wearable head device. In accordance with a determination that the first version of the virtual three-dimensional model comprises the constituent part, a request is not made to the host device for data associated with the constituent part.

15 Claims, 22 Drawing Sheets

(56) References Cited

U.S. PATENT DOCUMENTS

| | | | |
|---|---|---|---|
| 2013/0207976 A1* | 8/2013 | Jenkins | G06T 15/20 345/420 |
| 2013/0215115 A1* | 8/2013 | Jenkins | G06T 19/003 345/420 |
| 2013/0238288 A1* | 9/2013 | Rolleston | G06Q 30/0621 703/1 |
| 2013/0239487 A1* | 9/2013 | Ingjaldsdottir | E04B 1/3483 52/79.1 |
| 2014/0162781 A1* | 6/2014 | Butler | A63F 13/798 463/31 |
| 2014/0200863 A1* | 7/2014 | Kamat | G06T 19/00 703/1 |
| 2015/0212343 A1 | 7/2015 | Fonte | |
| 2017/0227765 A1 | 8/2017 | Mammou | |
| 2018/0021068 A1 | 1/2018 | May et al. | |
| 2018/0081429 A1 | 3/2018 | Akenine-Moller et al. | |
| 2019/0228558 A1* | 7/2019 | Kobayashi | G06T 15/04 |
| 2019/0243599 A1* | 8/2019 | Rochford | G06F 3/147 |

FOREIGN PATENT DOCUMENTS

| | | |
|---|---|---|
| WO | 2018021068 A1 | 2/2018 |
| WO | 2020068878 A1 | 4/2020 |

OTHER PUBLICATIONS

Azuma, Ronald T. (Aug. 1997). "A Survey of Augmented Reality," In Presence: Teleoperators and Virtual Environments 6, 4, Hughes Research Laboratories, Malibu, CA, located at: https://web.archive.org/web/20010604100006/http://www.cs.unc.edu/~azuma/ARpresence.pdf, retrieved on Oct. 26, 2020.

Bimber, Oliver et al. (2005). "Spatial Augmented Reality: Merging Real and Virtual Worlds," A. K. Peters, Ltd., Wellesley, MA.

International Preliminary Report on Patentability and Written Opinion dated Apr. 1, 2021, for PCT Application No. PCT/US2019/052798, filed Sep. 24, 2019, seven pages.

European Search Report dated Nov. 4, 2021, for EP Application No. 19866679.4, eleven pages.

* cited by examiner

METHODS AND SYSTEMS FOR THREE-DIMENSIONAL MODEL SHARING

CROSS-REFERENCE TO RELATED APPLICATION

This application claims priority to U.S. Provisional Application No. 62/735,675, filed on Sep. 24, 2018, the contents of which are incorporated by reference herein in their entirety.

FIELD

The present disclosure relates to sharing three-dimensional models between two or more computing systems, including mixed reality, imaging and visualization systems.

BACKGROUND

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Examples of the disclosure describe systems and methods for decomposing and sharing 3D models. In an example method, a first version of a virtual three-dimensional model is displayed via a display of a wearable head device. A request is made to a host device for data associated with a second version of the virtual three-dimensional model, wherein the second version of the virtual three-dimensional model comprises a constituent part. It is determined whether the first version of the virtual three-dimensional model comprises the constituent part. In accordance with a determination that the first version of the virtual three-dimensional model does not comprise the constituent part, a request is made to the host device for data associated with the constituent part. The second version of the virtual three-dimensional model is displayed, via the display of the wearable head device. In accordance with a determination that the first version of the virtual three-dimensional model comprises the constituent part, a request is not made to the host device for data associated with the constituent part.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

Figure 1:
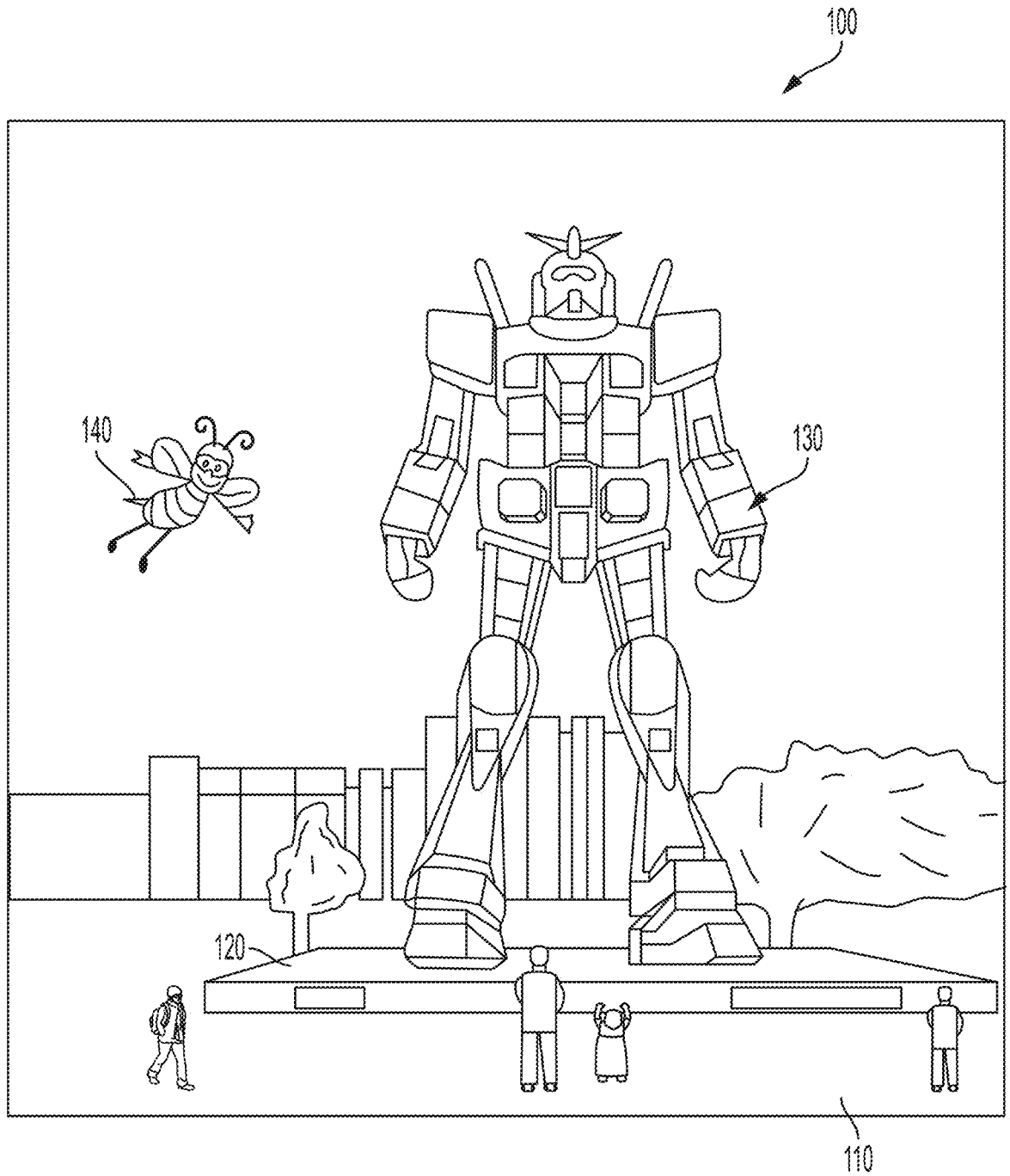
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of any object, action, signal, parameter, coordinate, vector, or other characteristic associated with that space. In some examples, circuitry (e.g., a processor) of a computing device can maintain and update a state of a virtual environment; that is, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input (e.g., real world parameters), to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

[30] Output devices, such as a display or a speaker, can present any or all aspects of a virtual environment to a user. For example, a virtual environment may include virtual objects (which may include representations of inanimate objects; people; animals; lights; etc.) that may be presented to a user. A processor can determine a view of the virtual environment (for example, corresponding to a "camera" with an origin coordinate, a view axis, and a frustum); and render, to a display, a viewable scene of the virtual environment corresponding to that view. Any suitable rendering technology may be used for this purpose. In some examples, the viewable scene may include only some virtual objects in the virtual environment, and exclude certain other virtual objects. Similarly, a virtual environment may include audio aspects that may be presented to a user as one or more audio signals. For instance, a virtual object in the virtual environment may generate a sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "listener" coordinate—for instance, an audio signal corresponding to a composite of sounds in the virtual environment, and mixed and processed to simulate an audio signal that would be heard by a listener at the listener coordinate—and present the audio signal to a user via one or more speakers.

Because a virtual environment exists only as a computational structure, a user cannot directly perceive a virtual environment using one's ordinary senses. Instead, a user can perceive a virtual environment only indirectly, as presented to the user, for example by a display, speakers, haptic output devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to move an object in a virtual environment, and a processor can use that data to cause the object to respond accordingly in the virtual environment.

A mixed reality system can present to the user, for example using a transmissive display and/or one or more speakers (which may, for example, be incorporated into a wearable head device), a mixed reality ("MR") environment that combines aspects of a real environment and a virtual environment. In some embodiments, the one or more speakers may be external to the head-mounted wearable unit. As used herein, an MR environment is a simultaneous representation of a real environment and a corresponding virtual environment. In some examples, the corresponding real and virtual environments share a single coordinate space; in some examples, a real coordinate space and one or more corresponding virtual coordinate spaces are related to each other by one or more transformation matrices (or other suitable representation). Accordingly, in some embodiments, a single coordinate (along with, in some examples, a transformation matrix) can define a first location in the real environment, and also a second, corresponding, location in the virtual environment; and vice versa.

In an MR environment, a virtual object (e.g., in a virtual environment associated with the MR environment) can correspond to a real object (e.g., in a real environment associated with the MR environment). For instance, if the real environment of an MR environment comprises a real lamp post (a real object) at a location coordinate, the virtual environment of the MR environment may comprise a corresponding virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of an MR environment, not all real objects in a real environment may be associated with a corresponding virtual object. Likewise, in some examples of an MR environment, not all virtual objects in a virtual environment may be associated with a corresponding real object. That is, some virtual objects may solely in a virtual environment of an MR environment, without any real-world counterpart. In some examples, not all real objects may be associated with a corresponding real object.

In some examples, virtual objects may have characteristics that differ, sometimes drastically, from those of corresponding real objects. For instance, while a real environment in an MR environment may comprise a green, two-armed cactus—a prickly inanimate object—a corresponding virtual object in the MR environment may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment, perhaps at a location corresponding to an empty space in a real environment).

Compared to VR systems, which present the user with a virtual environment while obscuring the real environment, a mixed reality system presenting an MR environment affords the advantage that the real environment remains perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

Figure 19A:
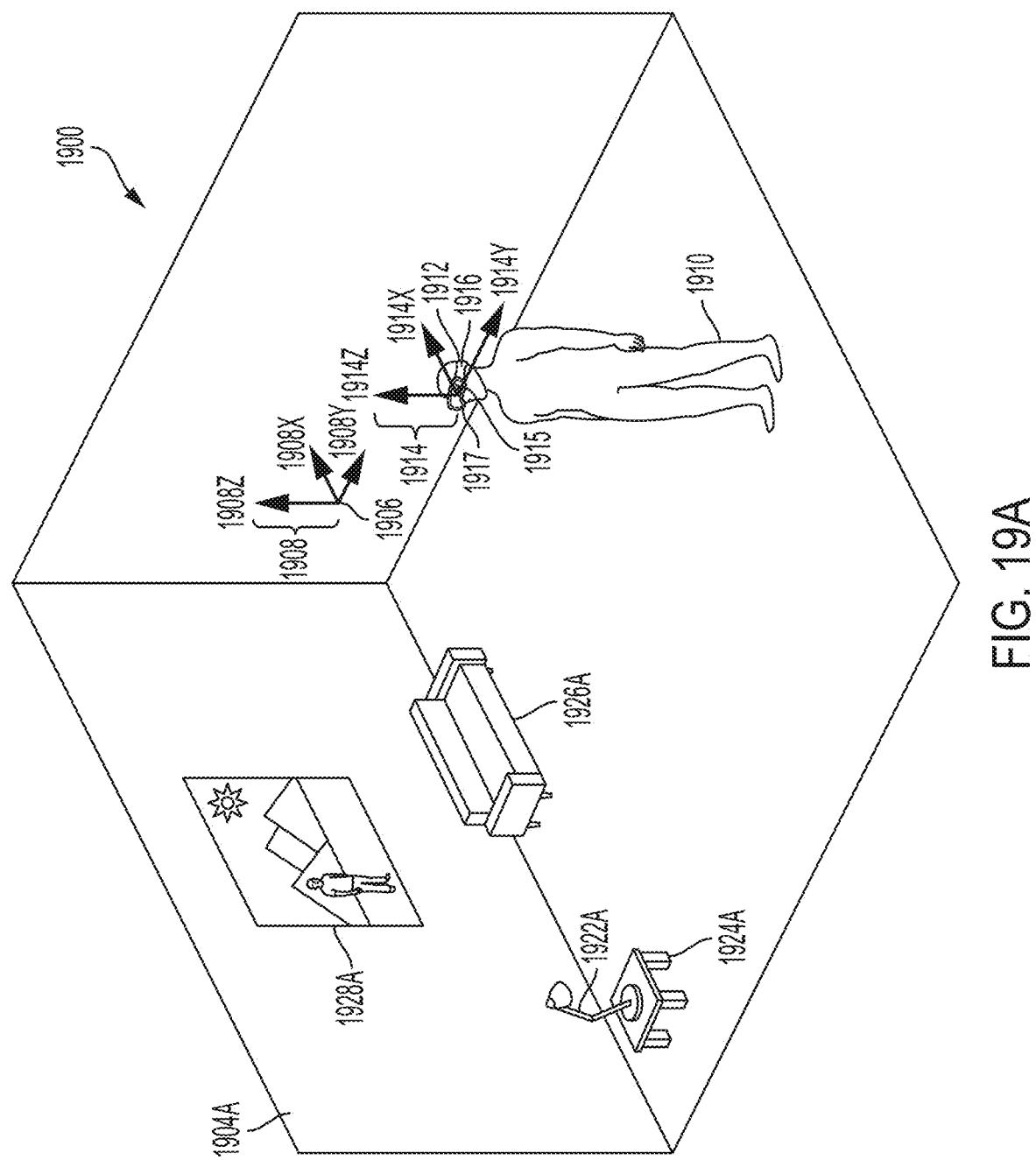
FIGS. 19A-19C illustrate an example mixed reality environment.

FIG. 19A illustrates an example real environment 1900 in which a user 1910 uses a mixed reality system 1912. Mixed reality system 1912 may comprise a display (e.g., a transmissive display) and one or more speakers, and one or more sensors (e.g., a camera), for example as described below. The real environment 1900 shown comprises a rectangular room 1904A, in which user 1910 is standing; and real objects 1922A (a lamp), 1924A (a table), 1926A (a sofa), and 1928A (a painting). Room 1904A further comprises a location coordinate 1906, which may be considered an origin of the real environment 1900. As shown in FIG. 19A, an environment/world coordinate system 1908 (comprising an x-axis 1908X, a y-axis 1908Y, and a z-axis 1908Z) with its origin at point 1906 (a world coordinate), can define a coordinate space for real environment 1900. In some embodiments, the origin point 1906 of the environment/world coordinate system 1908 may correspond to where the mixed reality system 1912 was powered on. In some embodiments, the origin point 1906 of the environment/world coordinate system 1908 may be reset during operation. In some examples, user 1910 may be considered a real object in real environment 1900; similarly, user 1910's body parts (e.g., hands, feet) may be considered real objects in real environment 1900. In some examples, a user/listener/head coordinate system 1914 (comprising an x-axis 1914X, a y-axis 1914Y, and a z-axis 1914Z) with its origin at point 1915 (e.g., user/listener/head coordinate) can define a coordinate space for the user/listener/head on which the mixed reality system 1912 is located. The origin point 1915 of the user/listener/head coordinate system 1914 may be defined relative to one or more components of the mixed reality system 1912. For example, the origin point 1915 of the user/listener/head coordinate system 1914 may be defined relative to the display of the mixed reality system 1912 such as during initial calibration of the mixed reality system 1912. A matrix (which may include a translation matrix and a Quaternion matrix or other rotation matrix), or other suitable representation can characterize a transformation between the user/listener/head coordinate system 1914 space and the environment/world coordinate system 1908 space. In some embodiments, a left ear coordinate 1916 and a right ear coordinate 1917 may be defined relative to the origin point 1915 of the user/listener/head coordinate system 1914. A matrix (which may include a translation matrix and a Quaternion matrix or other rotation matrix), or other suitable representation can characterize a transformation between the left ear coordinate 1916 and the right ear coordinate 1917, and user/listener/head coordinate system 1914 space. The user/listener/head coordinate system 1914 can simplify the representation of locations relative to the user's head, or to a head-mounted device, for example, relative to the environment/world coordinate system 1908. Using Simultaneous Localization and Mapping (SLAM), visual odometry, or other techniques, a transformation between user coordinate system 1914 and environment coordinate system 1908 can be determined and updated in real-time.

Figure 19B:
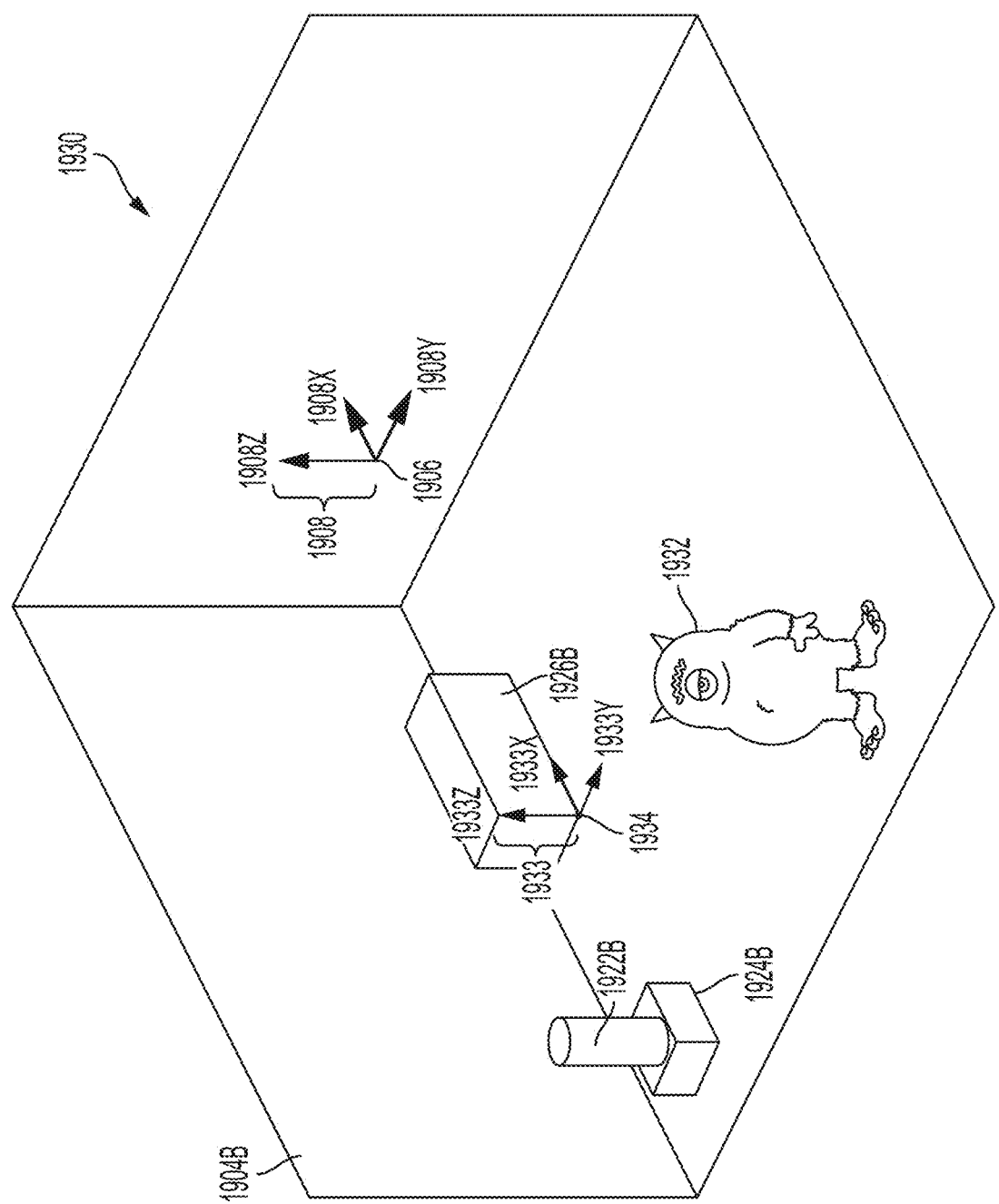

FIG. 19B illustrates an example virtual environment 1930 that corresponds to real environment 1900. The virtual environment 1930 shown comprises a virtual rectangular room 1904B corresponding to real rectangular room 1904A; a virtual object 1922B corresponding to real object 1922A; a virtual object 1924B corresponding to real object 1924A; and a virtual object 1926B corresponding to real object 1926A. Metadata associated with the virtual objects 1922B, 1924B, 1926B can include information derived from the corresponding real objects 1922A, 1924A, 1926A. Virtual environment 1930 additionally comprises a virtual monster 1932, which does not correspond to any real object in real environment 1900. Real object 1928A in real environment 1900 does not correspond to any virtual object in virtual environment 1930. A persistent coordinate system 1933 (comprising an x-axis 1933X, a y-axis 1933Y, and a z-axis 1933Z) with its origin at point 1934 (persistent coordinate), can define a coordinate space for virtual content. The origin point 1934 of the persistent coordinate system 1933 may be defined relative/with respect to one or more real objects, such as the real object 1926A. A matrix (which may include a translation matrix and a Quaternion matrix or other rotation matrix), or other suitable representation can characterize a transformation between the persistent coordinate system 1933 space and the environment/world coordinate system 1908 space. In some embodiments, each of the virtual objects 1922B, 1924B, 1926B, and 1932 may have their own persistent coordinate point relative to the origin point 1934 of the persistent coordinate system 1933. In some embodiments, there may be multiple persistent coordinate systems and each of the virtual objects 1922B, 1924B, 1926B, and 1932 may have their own persistent coordinate point relative to one or more persistent coordinate systems.

With respect to FIGS. 19A and 19B, environment/world coordinate system 1908 defines a shared coordinate space for both real environment 1900 and virtual environment 1930. In the example shown, the coordinate space has its origin at point 1906. Further, the coordinate space is defined by the same three orthogonal axes (1908X, 1908Y, 1908Z). Accordingly, a first location in real environment 1900, and a second, corresponding location in virtual environment 1930, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (which may include a translation matrix and a Quaternion matrix or other rotation matrix), or other suitable representation can characterize a transformation between a real environment coordinate space and a virtual environment coordinate space.

Figure 19C:
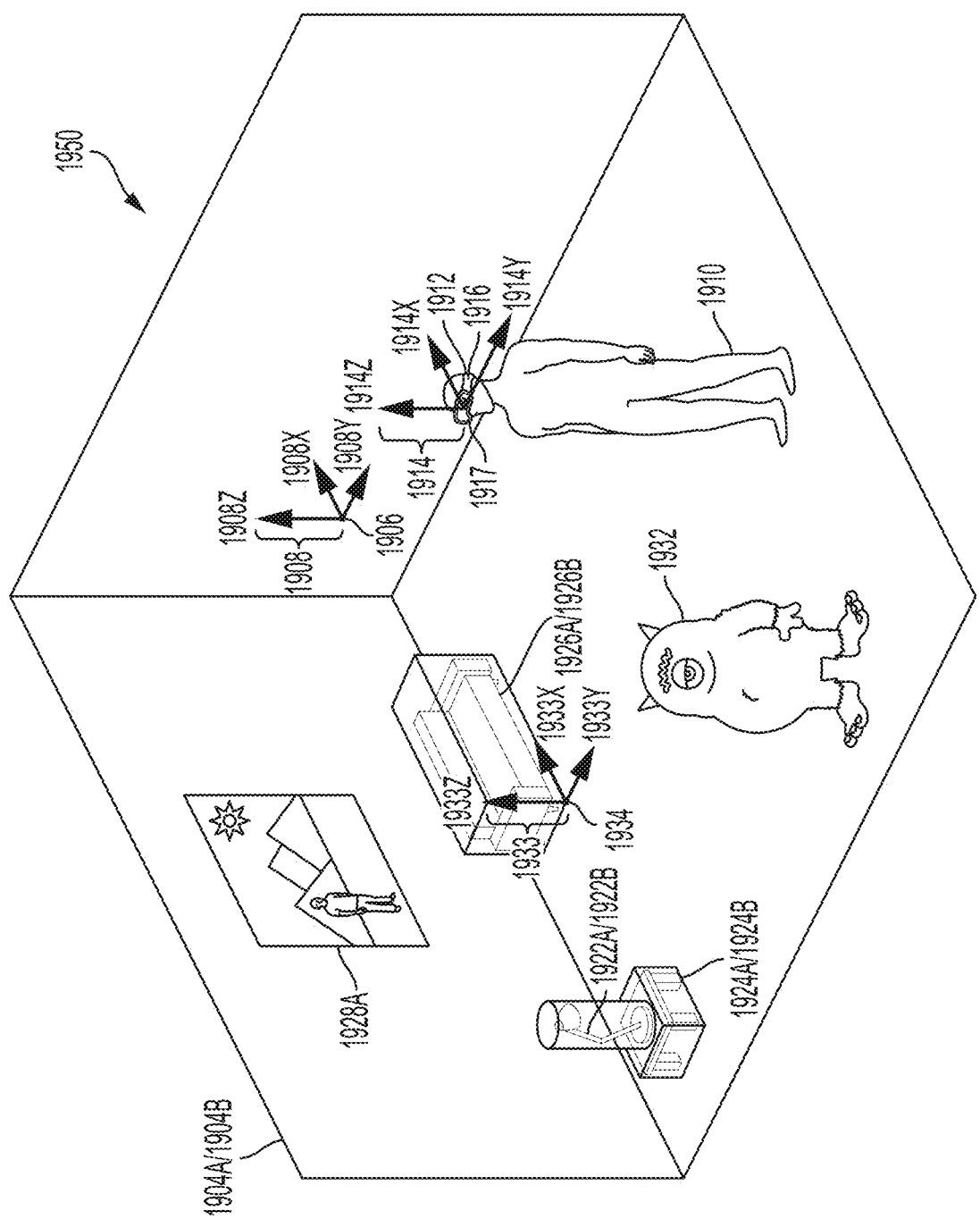

FIG. 19C illustrates an example MR environment 1950 that simultaneously presents aspects of real environment 1900 and virtual environment 1930 to user 1910 via mixed reality system 1912. In the example shown, MR environment 1950 simultaneously presents user 1910 with real objects 1922A, 1924A, 1926A, and 1928A from real environment 1900 (e.g., via a transmissive portion of a display of mixed reality system 1912); and virtual objects 1922B, 1924B, 1926B, and 1932 from virtual environment 1930 (e.g., via an active display portion of the display of mixed reality system 1912). As above, origin point 1906 acts as an origin for a coordinate space corresponding to MR environment 1950, and coordinate system 1908 defines an x-axis, y-axis, and z-axis for the coordinate space.

In the example shown, mixed reality objects comprise corresponding pairs of real objects and virtual objects (i.e., 1922A/1922B, 1924A/1924B, 1926A/1926B) that occupy corresponding locations in coordinate space 1908. In some examples, both the real objects and the virtual objects may be simultaneously visible to user 1910. This may be desirable in, for example, instances where the virtual object presents information designed to augment a view of the corresponding real object (such as in a museum application where a virtual object presents the missing pieces of an ancient damaged sculpture). In some examples, the virtual objects (1922B, 1924B, and/or 1926B) may be displayed (e.g., via active pixelated occlusion using a pixelated occlusion shutter) so as to occlude the corresponding real objects (1922A, 1924A, and/or 1926A). This may be desirable in, for example, instances where the virtual object acts as a visual replacement for the corresponding real object (such as in an interactive storytelling application where an inanimate real object becomes a "living" character).

In some examples, real objects (e.g., 1922A, 1924A, 1926A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring unnecessary computational overhead.

In some examples, the presentation described above may also incorporate audio aspects. For instance, in MR environment 1950, virtual monster 1932 could be associated with one or more audio signals, such as a footstep sound effect that is generated as the monster walks around MR environment 1950. As described further below, a processor of mixed reality system 1912 can compute an audio signal corresponding to a mixed and processed composite of all such sounds in MR environment 1950, and present the audio signal to user 1910 via one or more speakers included in mixed reality system 1912 and/or one or more external speakers.

Mixed Reality Object Sharing

A 3D digital model of an object may be displayed as a virtual object to one or more real or digital people in an AR/VR/MR (hereinafter referred to as MR for simplicity) environment. For example, an automotive engineer may wish to share a new car design with co-workers at their weekly team meeting. Traditionally, design sharing may be accomplished by providing several different views of the design so the viewer is able to imagine the 3D object. In this case, the automotive engineer may print out perspective drawings to hand out to co-workers during the meeting. This may work for simple designs but it may be difficult for the viewer to piece together the 3D object in the viewers mind if the 3D object has a complex shape or design. Alternatively or additionally, traditional methods of sharing a 3D design or model may involve creating a physical prototype. In this example, the automotive engineer would need to spend a time and money creating the physical prototype. The physical prototype may make it easier to understand the designer's intent, but may only show a basic version of the design (viewer can only see the outside of the design but can't open it to view the internal components, for example).

Embodiments of the disclosed systems and methods may provide for improved 3D model sharing between computing systems. Continuing with the example above, the present invention may enable an automotive engineer to create a new digital 3D model of a car and then quickly and efficiently share the model with co-workers during the meeting. The present invention can also enable fast and easy unplanned sharing. For example, the automotive engineer's manager may wish to share a 3D design the manager had previously designed in order to collaborate with the automotive engineer. In some embodiments, the manager is able to access the old 3D car design and share with everyone present at the meeting without requiring people to download the design or click on a link to access.

Typically, in gaming for example, 3D models (alternatively called 3D assets, or 3D content) are pre-loaded in the game application so when a user starts up the game, all of the 3D assets that will be viewed by the user are already on the device. When updates are needed, the application will add new content offline. For example, the game may apply a patch when the game is not running, and when the application is next opened, the new content is installed and ready for use. This system of sharing new 3D models with two or more computing systems is convenient for infrequent, planned updates, but is impractical when new 3D models are frequently or unexpectedly required.

MR games or applications may be collaborative, where multiple people contribute towards a common goal, such as an entire a group of students learning about the anatomy of a frog in school. If the teacher tries to explain a concept and the students don't understand, it may be desirable for the teacher to display a virtual 3D model of a frog to the students so they can see what the teacher is describing. Traditional systems would require the students to download the 3D model or exit and re-enter the application so the teacher can push the new frog model update to the students. Additionally, such methods may require large amounts of disk storage in order to house all of the 3D asset data. An alternate method of accessing 3D models without using disk space, may be desirable.

These problems may be solved by methods and systems for streaming data over a network between a server and one or more clients. The server may have access to one or more 3D models and may have a 3D model sharing server application downloaded and running. The 3D model sharing application may break down the model into constituent data parts, compress, package, and send the constituent data parts to clients on the network. The client can receive the constituent parts during 3D model sharing client application runtime, reconstruct the 3D model, and view the 3D model. In some embodiments, runtime may be when the game or application loop is operating, when the screen is displaying application content, and/or when the computing system is operating with the framework of the application. Any number of clients may be part of the network. Any number of 3D models may be send to the clients. Two or more clients may be one person with two or more devices (e.g. computing systems) or may be two or more people each with one device.

An advantage of the present application is enabling 3D content sharing during runtime.

The term host may be used interchangeably with server. The terms 3D model, 3D asset, 3D content, and 3D model may be used interchangeably.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues can provide credible perceptions of depth.

Figure 2:
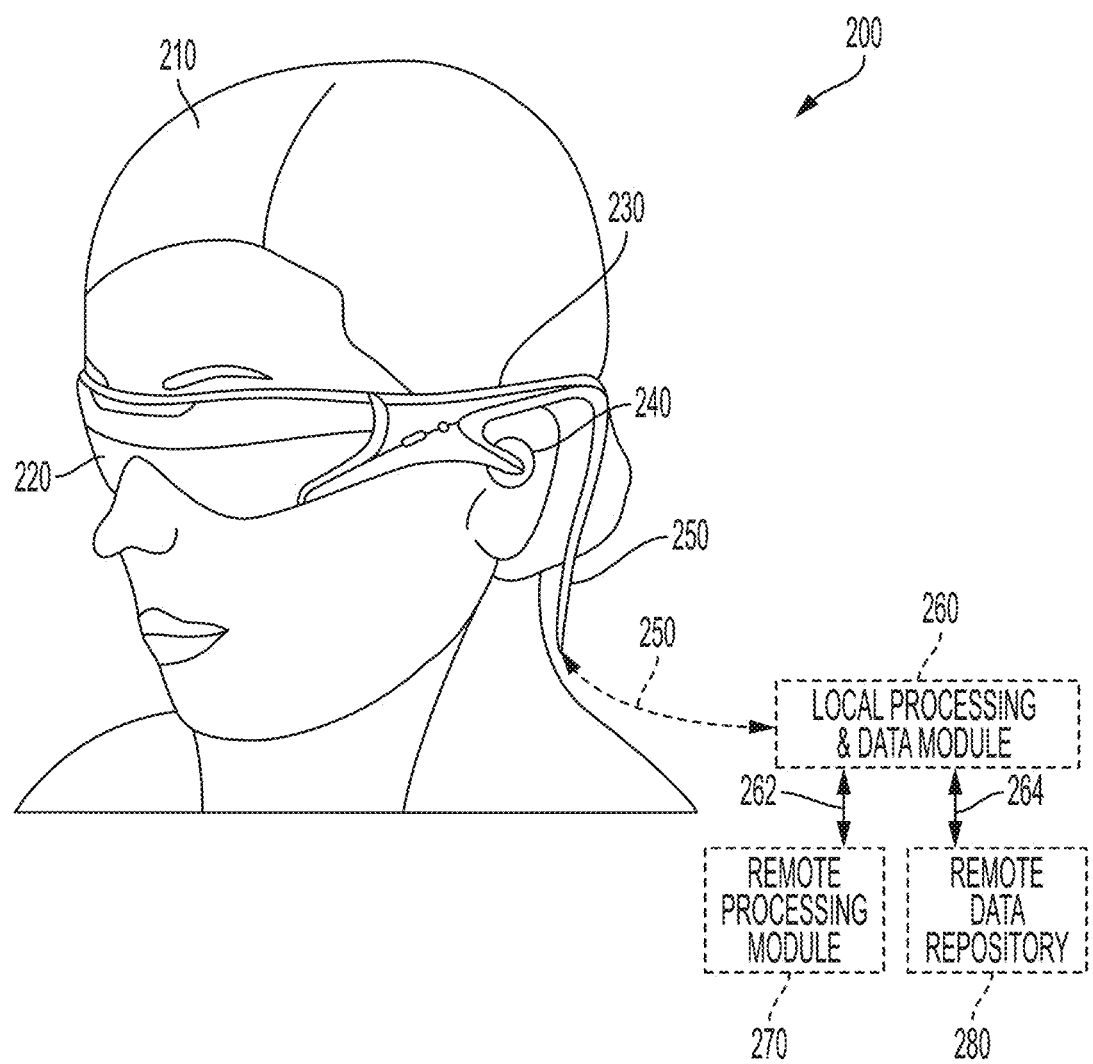
FIG. 2 schematically illustrates an example of a wearable system.

FIG. 2 illustrates an example of wearable system 200 which can be configured to provide an AR/VR/MR scene. The wearable system 200 can also be referred to as the AR system 200. The wearable system 200 can include a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 can be coupled to the frame 230 and positioned adjacent the ear canal of the user (in some embodiments, another speaker, not shown, can be positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, can be positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules can be available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data can be stored and all computations can be performed in the local processing and data module, allowing fully autonomous use from a remote module.

Example Components of a Wearable System

Figure 3:
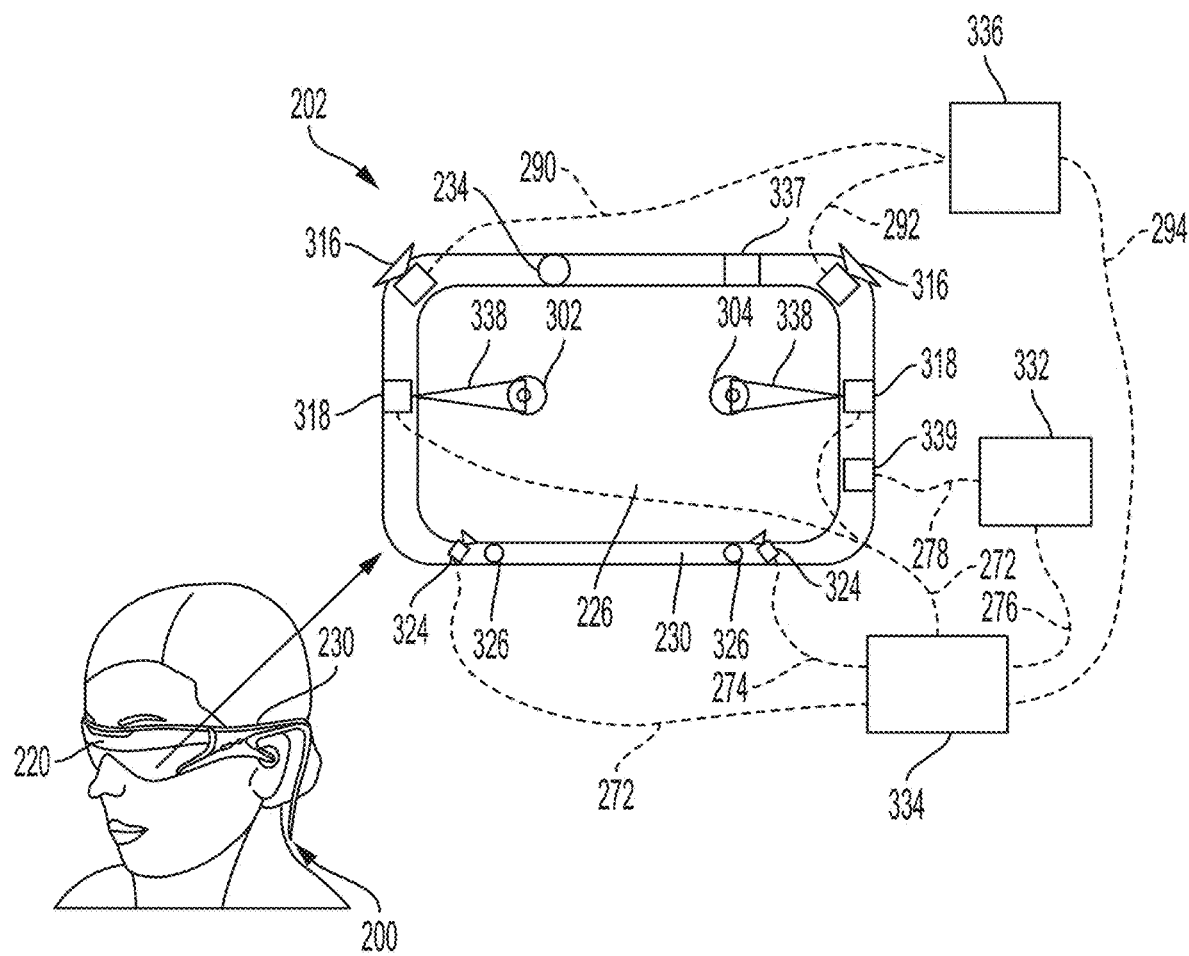
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors or diffractive optical elements positioned by the housing 230 in front of the user's eyes 302, 304 and may be configured to direct projected light 338 into the eyes 302, 304 and facilitate beam shaping, while also allowing for transmission of at least some light from the local environment. The wavefront of the projected light beam 338 may diverge to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of light projector modules with display optics and lens configured to direct light 338 into the eyes 302, 304 are shown. The depicted view also shows two miniature infrared cameras 324 paired with infrared light (such as light emitting diodes "LED"s), which can be configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

Also shown is a processor 332 which can be configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiments, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the vergence in focus, and all other objects at varying degrees of resolution. Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system can be configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image can be projected to coincide with the new focus. Thus, rather than forcing the user to a predetermined focus, the wearable system 200 of some embodiments can allow the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 can be configured to project virtual images at varying focal distances, through one or more variable focus elements (VFEs). In one or more embodiments, 3D perception may be achieved through a multi-plane focus system that projects images at fixed focal planes away from the user. Other embodiments can employ variable plane focus, wherein the focal plane may move back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 can comprise a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
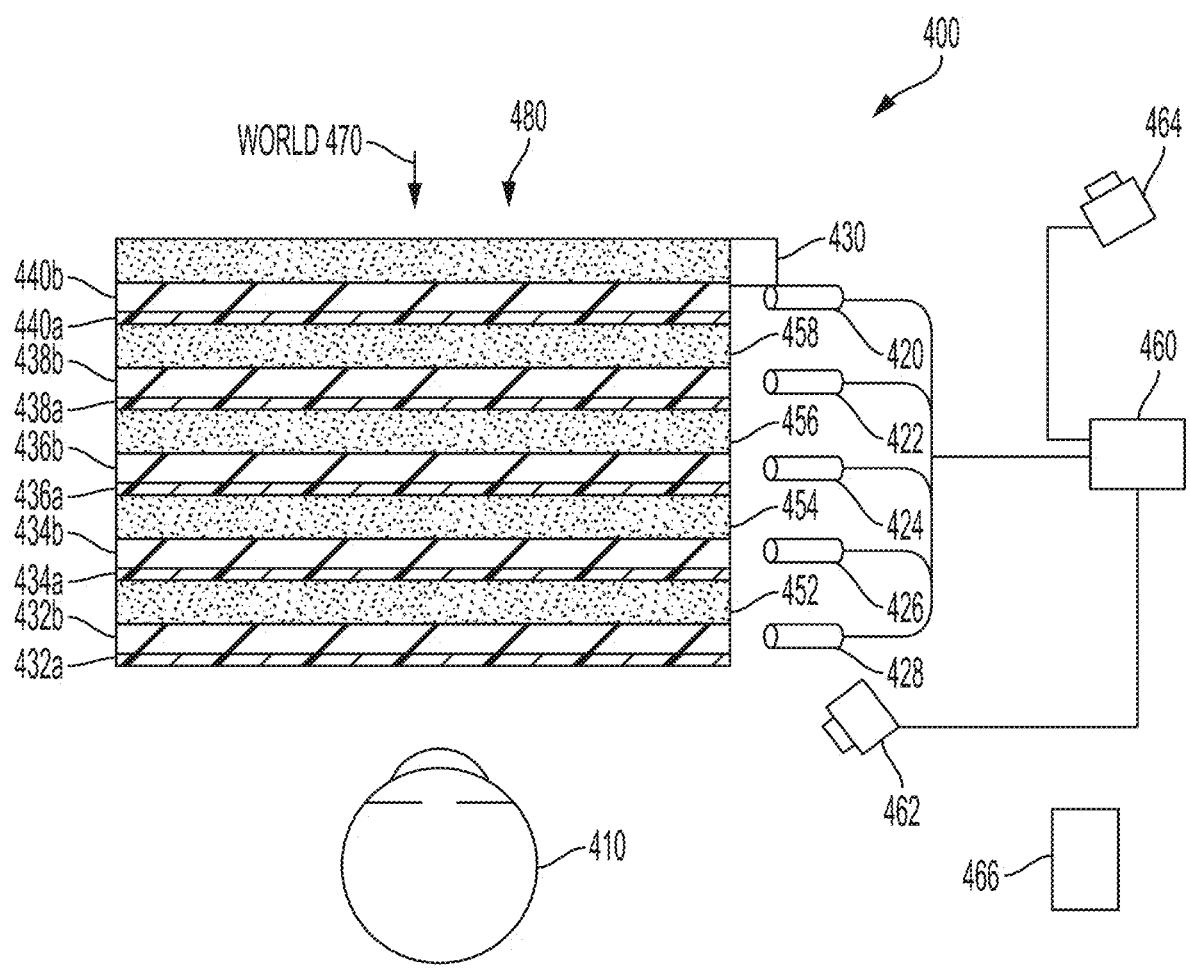
FIG. 4 schematically illustrates an example of a waveguide stack of a wearable device for outputting image information to a user.

FIG. 4 illustrates an example of a waveguide stack for outputting image information to a user. A wearable system 400 can include a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light can exit an output surface of the image injection devices 420, 422, 424, 426, 428 and can be injected into a corresponding input edge of the waveguides 440b, 438b, 436b, 434b, 432b. In some embodiments, a single beam of light (e.g., a collimated beam) may be injected into each waveguide to output an entire field of sample exit pupil beams that can be directed toward the eye 410 at particular angles (and amounts of divergence) corresponding to the depth plane associated with a particular waveguide.

In some embodiments, the image injection devices 420, 422, 424, 426, 428 can be discrete displays that each produce image information for injection into a corresponding waveguide 440b, 438b, 436b, 434b, 432b, respectively. In some other embodiments, the image injection devices 420, 422, 424, 426, 428 can be the output ends of a single multiplexed display which may, e.g., pipe image information via one or more optical conduits (such as fiber optic cables) to each of the image injection devices 420, 422, 424, 426, 428.

A controller 460 can control the operation of the display and the image injection devices 420, 422, 424, 426, 428. The controller 460 can include programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include optical elements 440a, 438a, 436a, 434a, 432a that can be configured to outcouple light out of a waveguide by diffracting or otherwise redirecting the light propagating within each respective waveguide. Outcoupled light can be outputted by the waveguide at locations at which the light propagating in the waveguide strikes a light redirecting element, such as a diffractive grating, for example. The optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the optical elements 440a, 438a, 436a, 434a, 432a may be disposed at the top or bottom major surfaces, or may be disposed directly in the volume of the waveguides 440b, 438b, 436b, 434b, 432b. In some embodiments, the optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the optical elements 440a, 438a, 436a, 434a, 432a may be formed on a surface or in the interior of that piece of material.

With continued reference to FIG. 4, as discussed herein, in some embodiments, each waveguide 440b, 438b, 436b, 434b, 432b can be configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b can pass its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) can be similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration can provide as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings.

In some embodiments, the light extracting optical elements 440a, 438a, 436a, 434a, 432a can be diffractive features that form a diffraction pattern, or "diffractive optical element" (also referred to herein as a "DOE"). Preferably, the DOE has a relatively low diffraction efficiency so that only a portion of the light of the beam is deflected toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets can comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field can increase such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include $4\pi$ steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) can be determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate may not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Example Processes of User Interactions with a Wearable System

Figure 5:
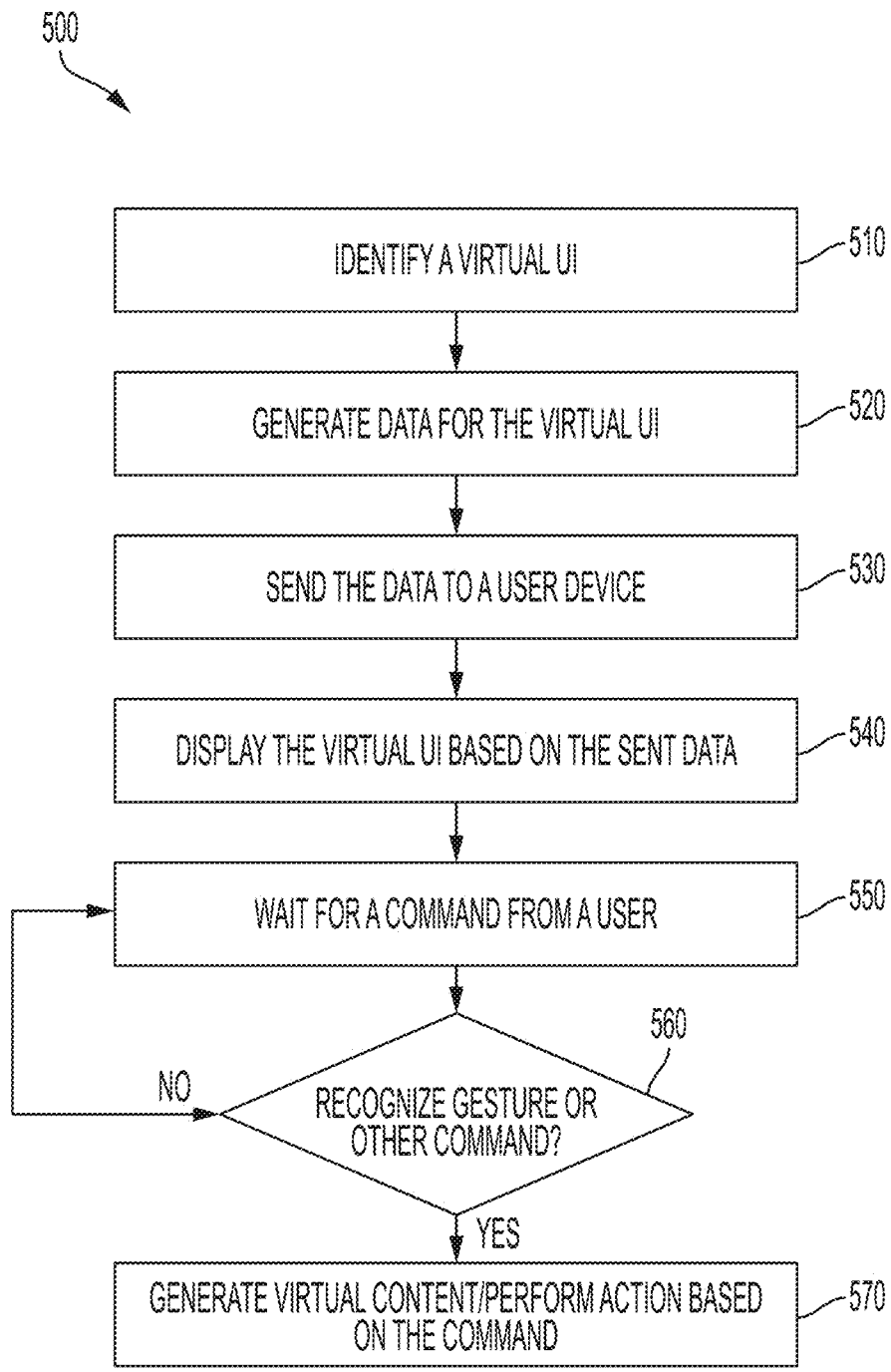
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
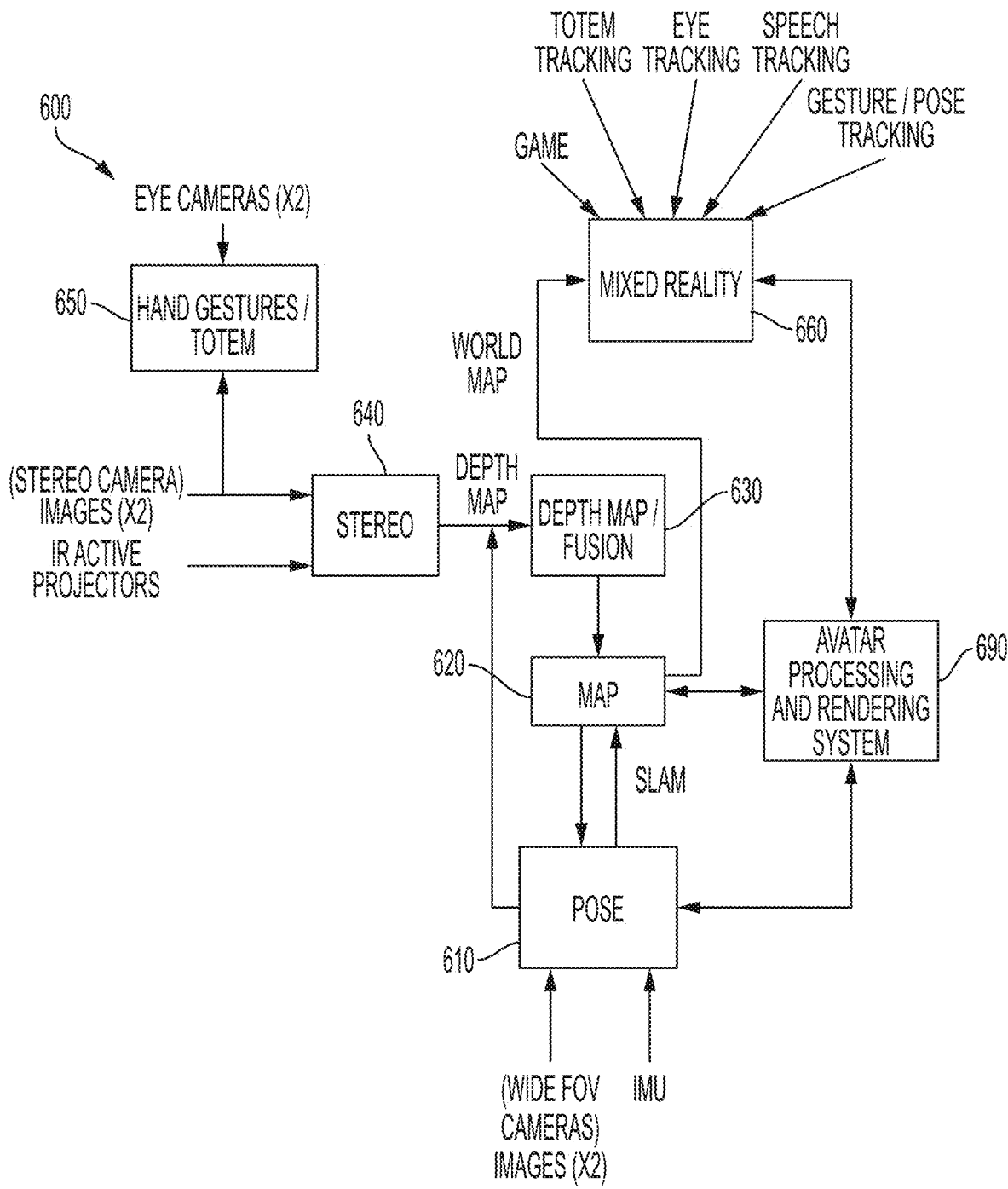
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630. Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world can become an input as well and can play a key role to almost any interactive system.

Controls or inputs from the user can be another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there can be various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking can be another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input and can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIG. 9.

Figure 6B:
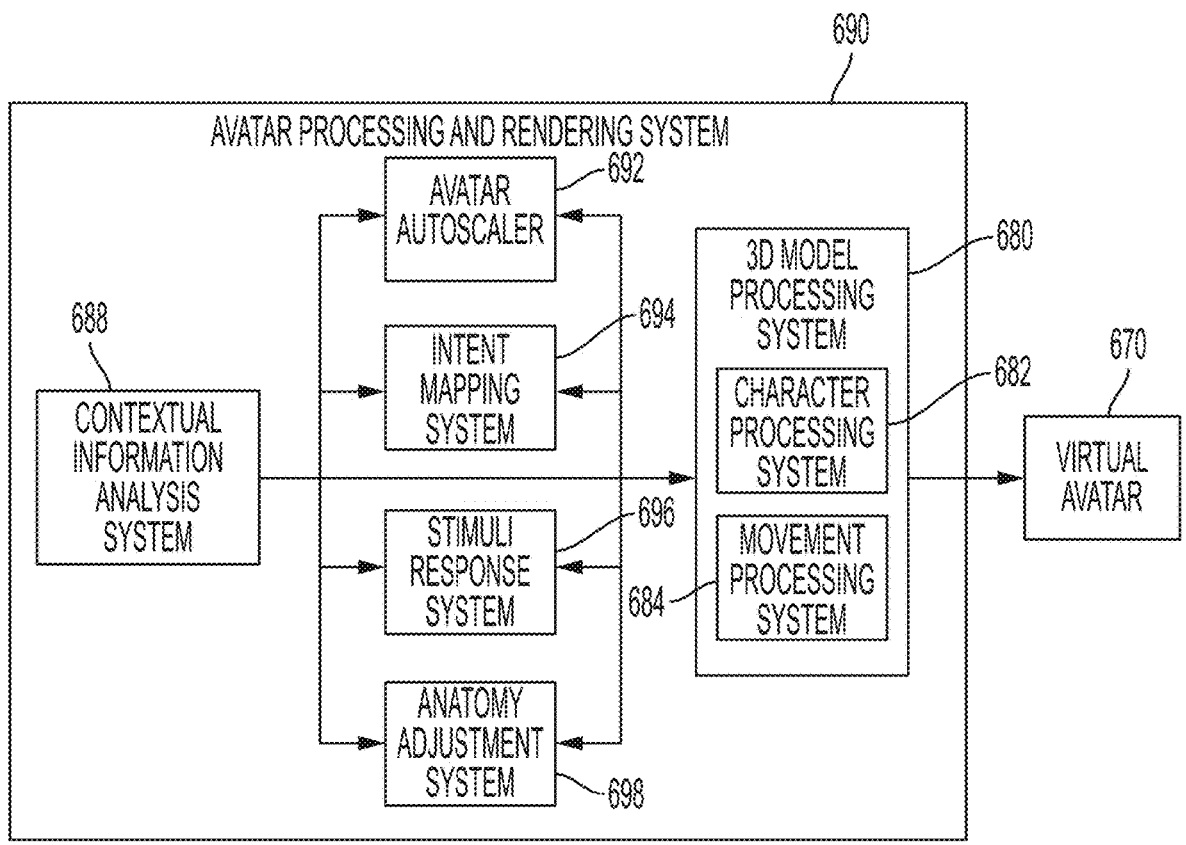
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) may not be at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

Examples of Mapping a User's Environment

Figure 7:
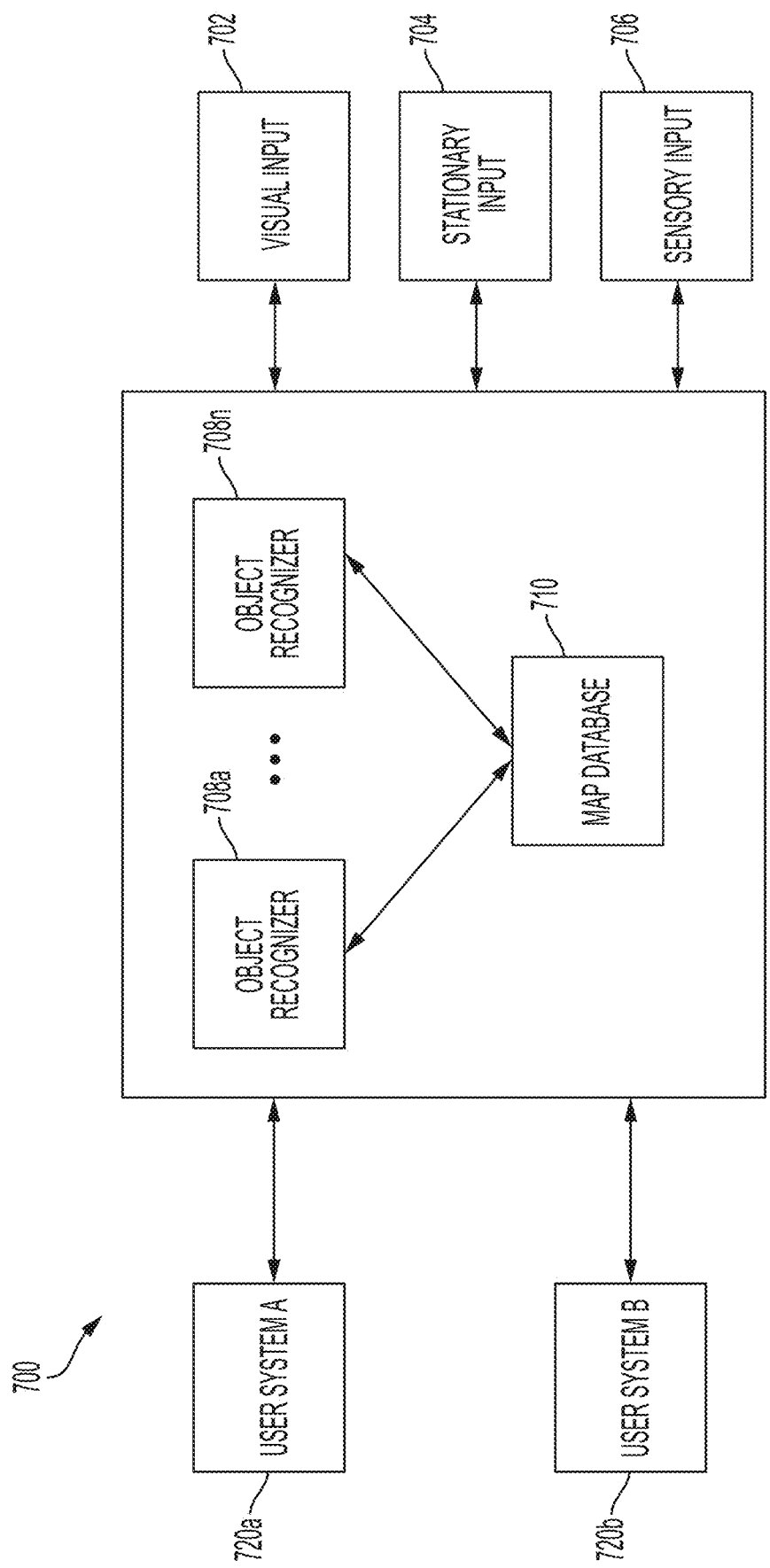
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HIVID. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HIVID can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database can grow as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
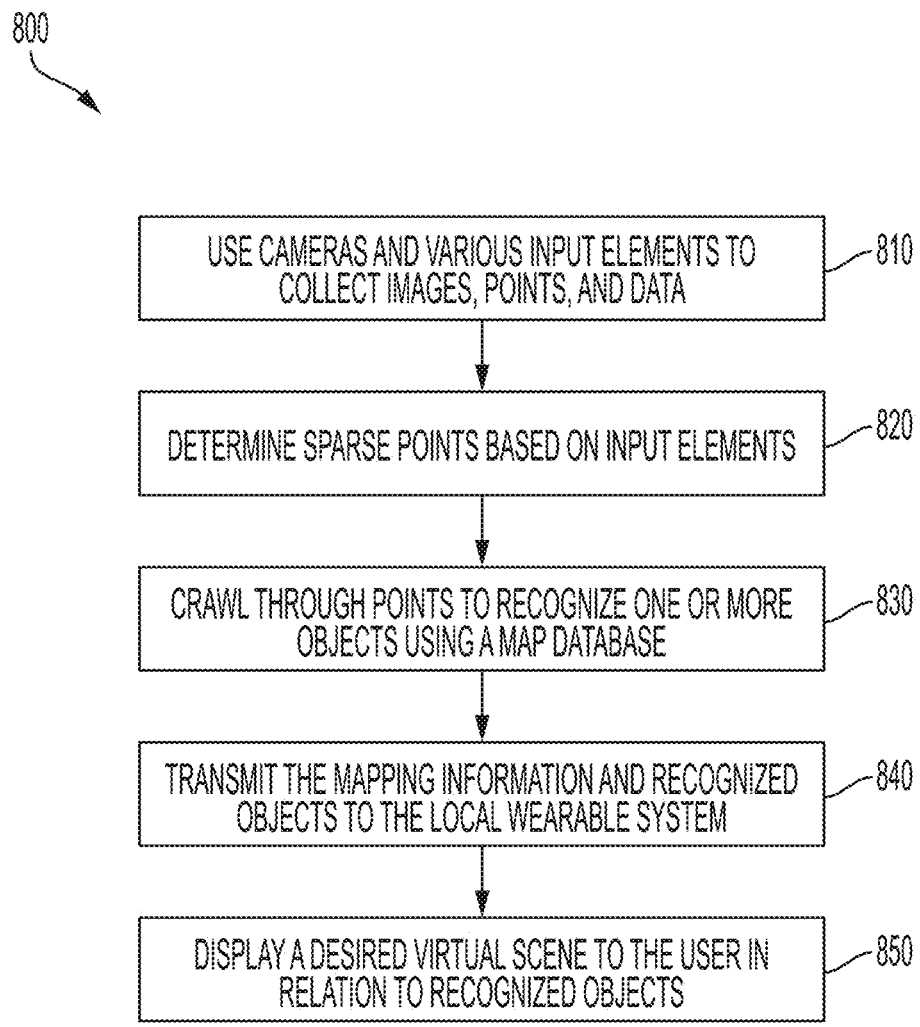
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications Among Multiple Wearable Systems

Figure 9:
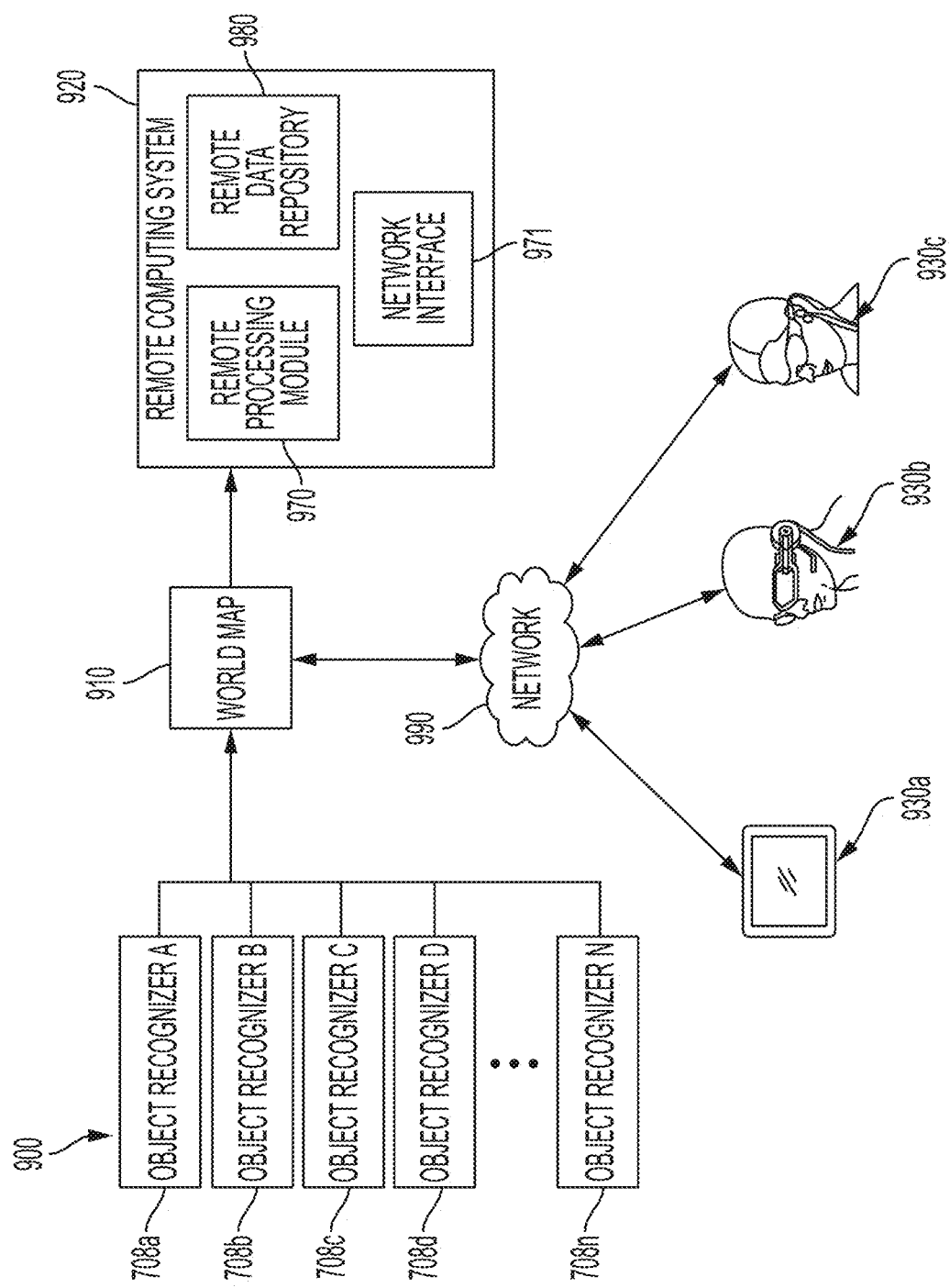
FIG. 9 schematically illustrates an overall system view depicting multiple wearable systems interacting with each other.

FIG. 9 schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c . . . 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g., selectively cropping a user's image, modifying the user's background, adding virtual objects to the user's environment, annotating a user's speech with auxiliary information, etc. The remote computing system 920 can send the processed information to the same and/or different user devices.

Example Process for 3D Model Sharing

Figure 10:
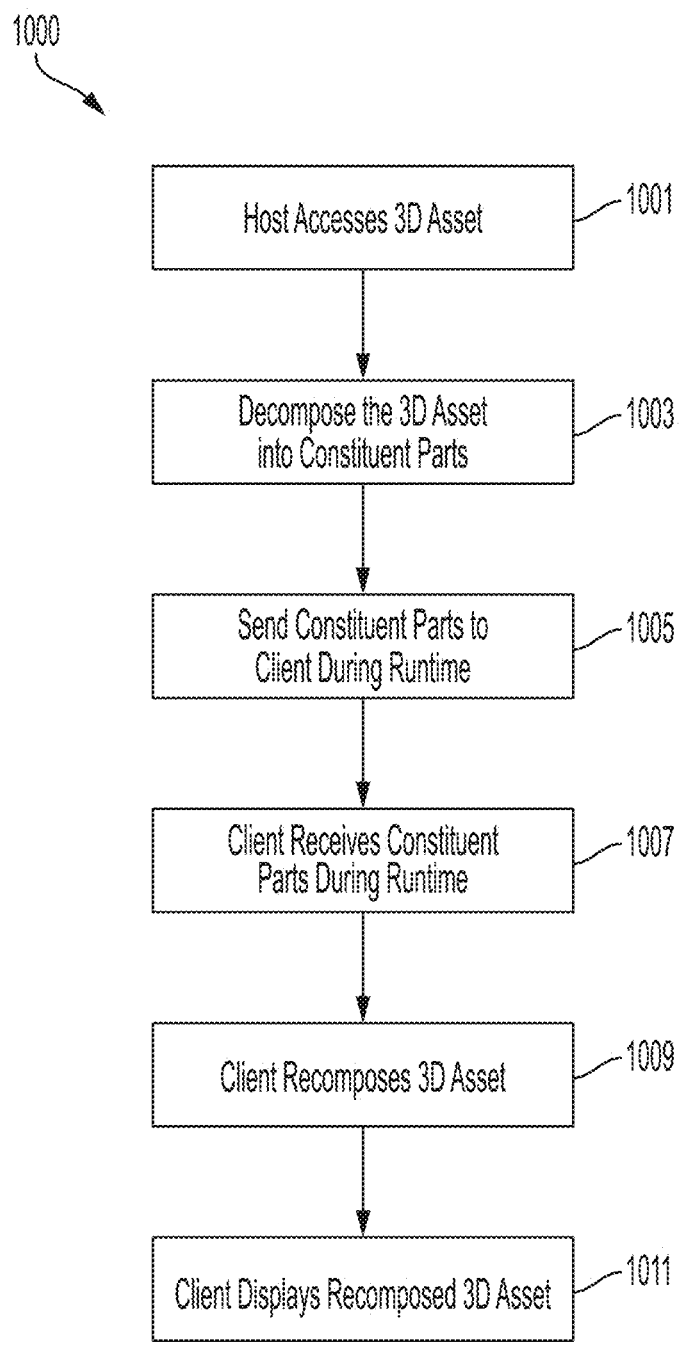
FIG. 10 illustrates an example process of sharing 3D assets using the system and methods described herein.

FIG. 10 illustrates an example process 1000 of sharing 3D assets using the system and methods described herein. At step 1001, the 3D sharing host application can access a 3D model file from the host system. The host may do this either by creating a new 3D asset on the host system or obtaining a 3D asset from an external system. The 3D asset may originate in a 3D modeling application such as AutoCad or 3D Studio Max, and may be of any file type. The host may utilize an asset import plug-in (e.g. ASSIMP) to enable graphical format interchange. The ASSIMP plugin may support up to 40 different file formats, for example, such as Filmbox (FBX) in .frx format or Autodesk Max 3D modeling (3DS) in .3ds format. In some embodiments, a custom program may be written to enable file format interchange. Any other suitable file format conversion method may be used to enable file reformatting for use within the host 3D sharing application.

At step 1003, the 3D sharing host application can decompose the 3D asset into constituent parts. Examples of constituent parts may be geometric data, material data, vertex tables, one or more textures, triangle indices, or any other data used to ultimately define a full representation of a 3D model.

At step 1005, the constituent parts can be sent to clients that are part of a network with the host. In some embodiments, there may be only one client. In some embodiments, there may be two or more clients. In a preferred embodiment, a local area network may be utilized utilizing a UDP protocol. The network may be a LAN, WAN, peer-to-peer network, radio, Bluetooth, ad hoc, or any other network. In some embodiments, the network may be the network 990 as described above. The host may be a remote computing system that may include server computer systems that are clustered and located at different geographic locations, as described above in context of 920. The client may be the user devices 930a, 930b, and/or 930c as described above. In some embodiments, there may be one host. In some embodiments, there may be two or more hosts. In some embodiments, each device connected to the network may be both a host and a client, in effect both sharing and receiving 3D assets from other devices on the network.

At step 1007, the client can receive the constituent parts.

At step 1009, the client can recompose the 3D asset from the constituent parts received from the host. In some embodiments, the 3D asset can be stored in the client device's memory. In some embodiments, the 3D asset may be saved for later use by the device.

At step 1011, the client can display the recomposed 3D asset. In some embodiments, the client may not display the recomposed 3D asset, or may display the asset at a later time, for example upon user request. In some embodiments, the client may display the recomposed 3D asset, but the user may not be able to see the recomposed 3D asset because it is outside of the user's FOV.

Example 3D Model Sharing System Configuration

Figure 11:
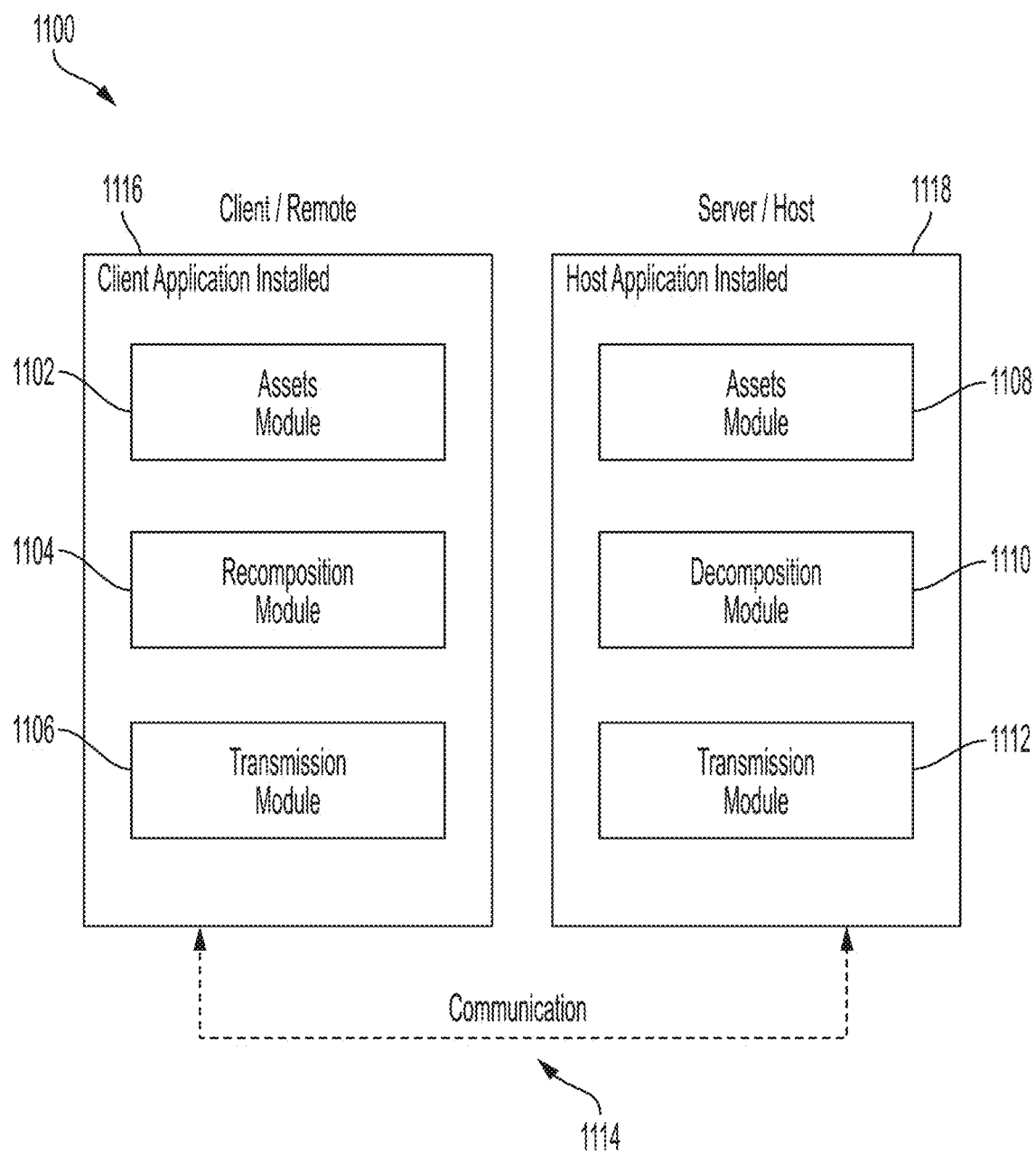
FIG. 11 illustrates an example 3D model sharing system configuration for sharing 3D assets using the system and methods described herein.

FIG. 11 illustrates an example 3D model sharing system configuration 1100 for sharing 3D assets using the system and methods described herein. FIG. 11 depicts a system configuration 1100 comprising one client (which may be called "remote") system 1116 and one server (which may be called "host") system 1118. The client system and the host system need not be physically separate systems; for example, in some embodiments, the client and the server can exist on the same physical device (e.g., as client and server threads concurrently executed by one or more processors of the same computer system). In practice, the 3D sharing system 1100 may generally require at least one host system 1118 that may function as a source of decomposed 3D assets. The host system 1118 may have authoritative control over the type and quantity of the 3D models available within the 3D sharing application. The 3D sharing system 1100 may have any number (e.g. zero, one, ten, etc.) of client systems 1116 operably connected to the host system 1118 through a communication network 1114. The communication network 1114 may be a LAN, for example utilizing a User Datagram Protocol (UDP). The host system 1118 may comprise one or more processors operably coupled to at least one display, and capable of receiving a communication from other computing systems. In some embodiments, the host system 1118 may be a PC desktop computer attached to a computer monitor with a network interface. In some embodiments, the host system 1118 may be system 200, 930a, 930b, or 930c as described above. The user devices 200, 930a, 930b, and 930c can communicate with each other and other computing systems through a communication network 1114. The user devices 930a-930c can each include a network interface to communicate via the network 1114 with remote computing systems, such as 920 (which may also include a network interface 971). The client system 1116 may comprise one or more processors operably coupled to at least one display, and capable of receiving a communication from other computing systems. In some embodiments, the client system 1116 may be a PC desktop computer attached to a computer monitor with a network interface. In some embodiments, the client system 1118 may be system 200, 930a, 930b, or 930c as described above. The user devices 200, 930a, 930b, and 930c can communicate with each other and other computing systems through a communication network 1114. The user devices 930a-930c can each include a network interface to communicate via the network 1114 with remote computing systems, such as 920 (which may also include a network interface 971).

The host system 1118 may have the 3D sharing host application installed. The 3D sharing host application may comprise three main modules: an assets module 1108, a decomposition module 1110, and a transmission module 1112. The assets module 1108 may comprise one or more full 3D models. The decomposition module 1110 may function to break a full 3D model into constituent parts, optionally compress the constituent parts, and place the constituent parts into one or more arrays that are ready to send to a different system. The arrays may be stored in one or more libraries that may contain one or more decomposed 3D models. The transmission module 1112 may function to break the constituent parts from the decomposition module 1110 into transferrable pieces of data and may manage the transmission protocols and processes. The transmission module 1112 may send the transferrable pieces of data to other systems connected on the communications network 1114.

The client, or remote, system 1116 may have a 3D sharing client application installed. The 3D sharing client application may comprise three main modules: a transmission module 1106, a recomposition module 1104, an assets module 1102. The transmission module 1106 may function to receive one or more decomposed 3D models and may manage the transmission and networking processes for the client system 1116. The transmission module 1106 may communicate with the 3D model sharing host application through messaging protocols. These protocols may be custom built protocols, or may utilize commonly used protocols. The recomposition module 1104 may function to reassemble the received decomposed 3D models from other systems on the network. The assets module 1102 may comprise one or more full 3D models.

Example Process for 3D Model Sharing

Figure 12:
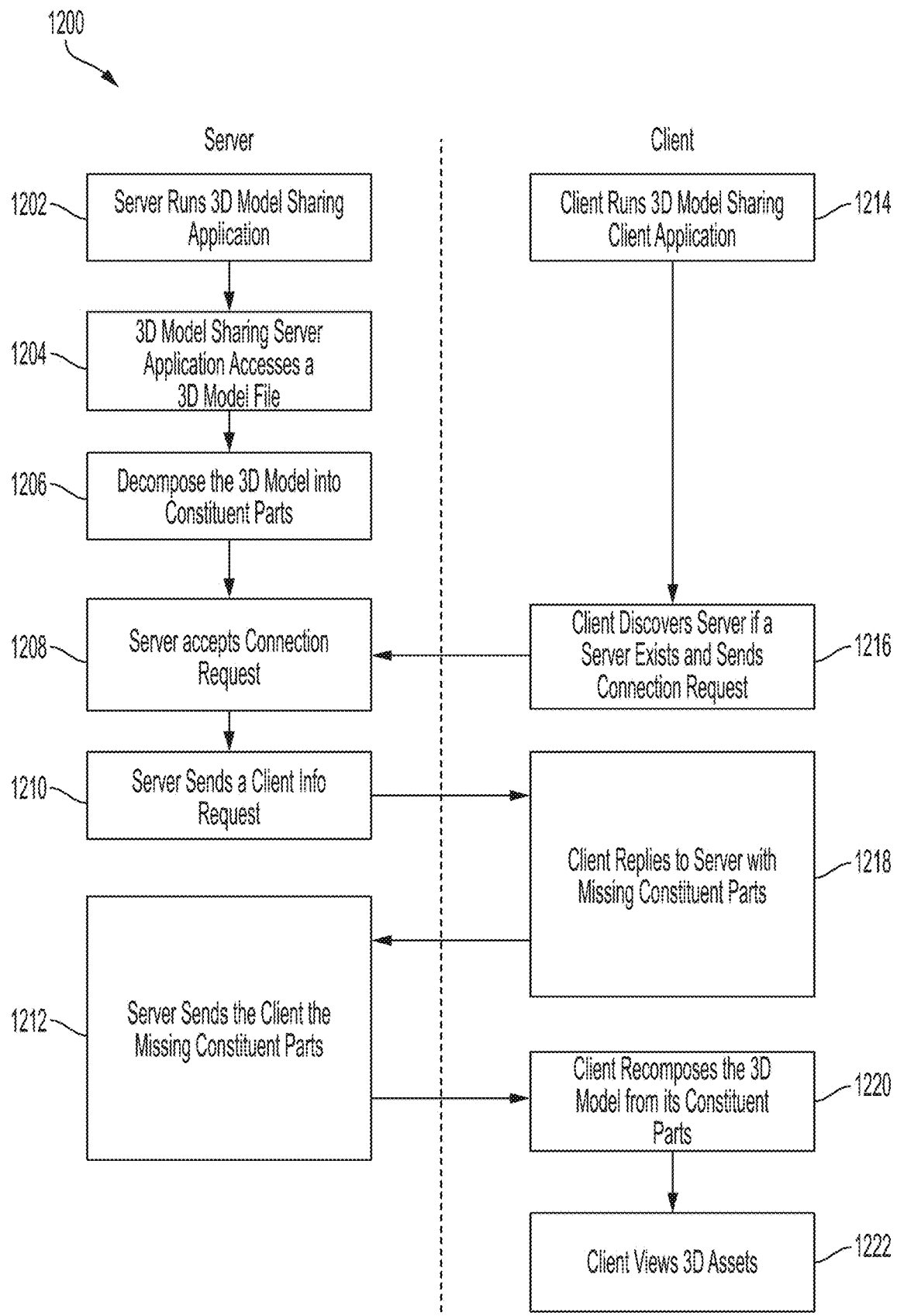
FIG. 12 illustrates an example 3D model sharing process between a server and client using the system and methods described herein.

FIG. 12 illustrates an example 3D model sharing process 1200 between a server and client using the system and methods described herein. The process 1200 may begin at step 1202, when a server system, such as server system 1118, opens a 3D model sharing host application.

At step 1204, the server may load one or more full 3D model files into the 3D model sharing host applications. The full 3D model file may originate on the host system 1118 from a different 3D modeling software downloaded on the host system 1118, such as AutoCad, for example. In some embodiments, the 3D model file may be imported from an outside source, such as an external hard drive, a remote computing system (ex: 920 from FIG. 9 above), or from cloud storage. In some embodiments, the 3D model file may originate from a 3D scanner or a similar device. The 3D model file may be imported using an ASSIMP, or equivalent, plug-in. The plug-in may convert the 3D model file from one format to a different file format that is compatible with the 3D model sharing host application. The plug-in may only be utilized by the host system, such as host system 1118 for example, because the file formatting may disappear at the server during the decomposition process, as described in more detail below.

At step 1206, the server system may decompose the 3D model into its constituent parts. Decomposing the 3D model can comprise identifying constituent parts within the 3D model. Decomposing the 3D model can be non-destructive, in that it does not result in a change to the 3D model itself (e.g., a loss of information in the 3D model), or a change in how the 3D model is rendered for viewing. Decomposing the 3D model can comprise applying data-level changes to the 3D model and/or its constituent parts (e.g., applying data formatting changes, or compressing constituent parts to facilitate sharing). The decomposition process may occur in decomposition module 1110, as described above. Constituent parts may be sub-sets of the data required to fully define a 3D model. The constituent parts sub-sets may be defined by pre-existing bundles of data comprising the 3D model, such as vertex tables, geometric data, material data, etc. In some embodiments, the constituent parts sub-sets may be defined in other ways, such as by the 3D model sharing application programmer.

At step 1214, a client system may open the 3D model sharing client application. This may initiate a series of steps related to networking protocols, communications, and discovery.

At step 1216, the 3D model sharing client application may discover a 3D model sharing host, if a host exists, via a network. The network may be a LAN (e.g. UDP). In some embodiments, the local network is private. In some embodiments, a cloud service is not used.

At step 1208, the server may receive a connection request from the client, and the server may accept the connection request.

At step 1210, the server may send a client info request back to the client. The client info request may contain a list of everything in the library of the 3D model sharing host application. The client info request may alternatively be called an asset inventory, or a table of contents.

At step 1218, the client may reply back to the server with data specifying which items are missing from the 3D model sharing client application library, when compared to the 3D model sharing server application library.

At step 1212, the server may respond by sending the client the items missing from the 3D model sharing client application. In some embodiments, the client may have recently opened the 3D model sharing application, and thus can start with zero items in its library. In this situation, the host may send its entire library to the client. In some embodiments, the libraries may be placed in memory, and may thus be erased when the 3D model sharing application is closed. In some embodiments, the libraries may be saved to disk, such as the client system hard drive, so the 3D models may be accessed at a later date. In some embodiments, the 3D model data that is sent to the client is a data structure without a file format. At the end of this step, the 3D model sharing host library may match the 3D model sharing client library. In other words, both the host system and the client system may now contain the same constituent parts for the same set of 3D models.

In some embodiments, a client may update items that are outdated when compared to items stored in a server. For example, the client info request may include version numbers associated with individual assets in an asset inventory. One or more assets in the server's asset inventory can correspond to assets stored with the client. The client can identify items stored in a client asset library that have lower version numbers than a corresponding item in the server's asset inventory. The client can send data to the server identifying items that require updating, and the server can respond by sending the client the corresponding updated items.

At step 1220, the client may recompose one or more 3D models from the new items sent from the server. In some embodiments, the client may now have the same full 3D models as the server.

At step 1222, the user of the client system may now view the 3D models shared by the host system.

Example 3D Model Sharing System Configuration

Figure 13:
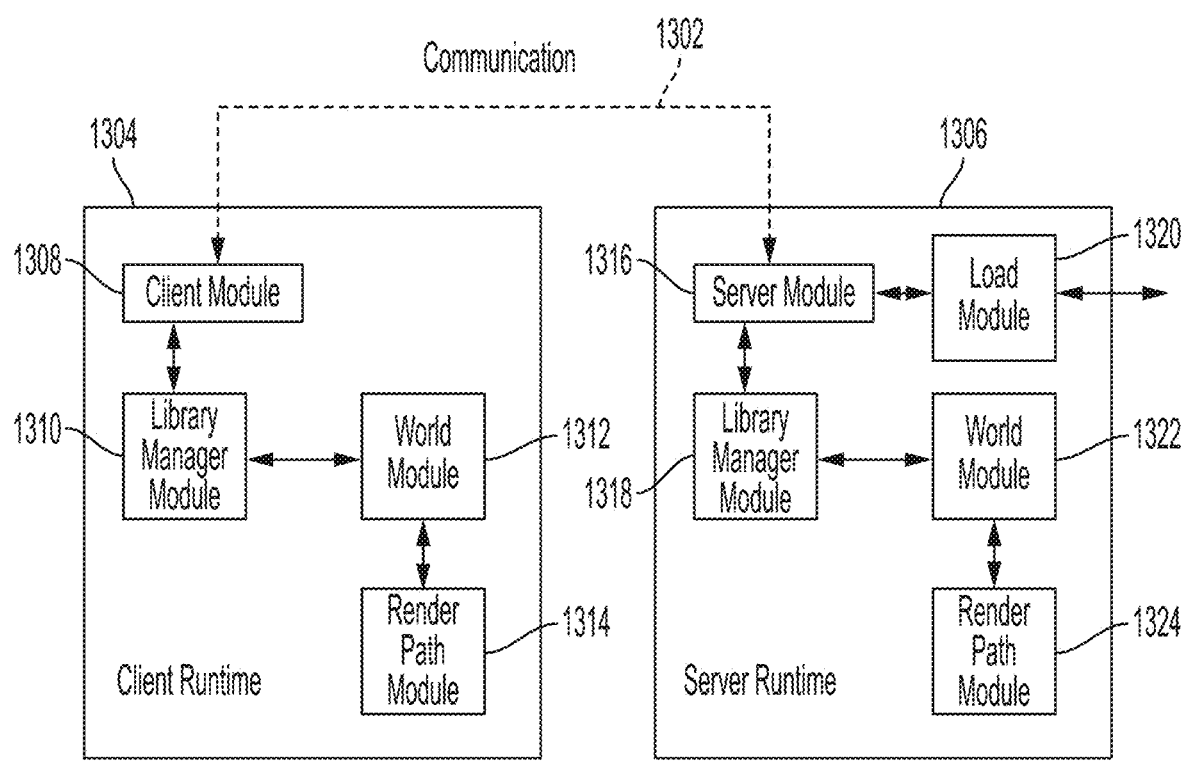
FIG. 13 illustrates an example 3D model sharing system configuration for sharing 3D assets using the system and methods described herein.

FIG. 13 illustrates an example 3D model sharing system configuration 1300 for sharing 3D assets using the system and methods described herein.

The 3D model sharing system configuration 1300 may comprise a host system 1306 and a client system 1304 operably coupled by a communication link 1302, such as a network. The client system 1304 may have the 3D model sharing client application open and running, and thus be operating in a runtime environment. The host system 1306 may have the 3D model sharing host application open and running, and thus be operating in a runtime environment. Although FIG. 13 depicts one server system and one host system, this is not meant to be limiting in scope, and is done for ease of illustration. In practice, the 3D model sharing system configuration 1300 may have only one host system 1306, more than one host system 1306, one client system 1304, more than one client system 1304, and/or one or more systems that function as both a host (e.g. sends 3D model data to other systems via communication 1302) and client (e.g. receives 3D model data from other systems via communication 1302). Further, in some embodiments, a single system can comprise both the host system and the client system. In some embodiments, host system 1306 may be host system 1118. In some embodiments, client system 1304 may be client system 1116. The host system 1306 may comprise one or more processors operably coupled to at least one display, for example a PC desktop computer attached to a computer monitor. In some embodiments, the host system 1306 may be system 200, 930*a*, 930*b*, or 930*c* as described above. The client system 1304 may comprise one or more processors operably coupled to at least one display, for example a PC desktop computer attached to a computer monitor. In some embodiments, the client system 1304 may be system 200, 930*a*, 930*b*, or 930*c* as described above.

Host system 1306 may comprise a server module 1316. The server module 1316 may manage functions and processes specific to being a server, such as transmission and networking protocols. The server module 1316 may receive and process connection requests, like steps 1208, 1210, and/or 1212 in process 1200. In some embodiments, the server module 1316 may comprise transmission module 1112.

Host system 1306 may comprise a host load module 1320. The load module may contain functions and processes that enable the 3D model sharing host application to import or load a 3D asset into the 3D model sharing host application or onto the host system 1306. The load module 1320 may comprise an ASSIMP plug-in. In some embodiments, step 1204 from process 1200 may occur within the load module 1320. In some embodiments, step 1001 from process 1000 may occur within the load module 1320. In some embodiments, the assets module 1108 may comprise the load module 1320.

Host system 1306 may comprise a host library manager module 1318. The library manager module 1318 may contain and manage the data and processes corresponding to 3D assets that have already been loaded into the 3D asset sharing host application. The library manager module 1318 may contain and manage the data and processes corresponding to the 3D asset sharing host application's libraries. This may include the decomposition process, maintaining the library table of contents, etc. In some embodiments, step 1206 from process 1200 may occur in the library manager module 1318. In some embodiments, step 1003 from process 1000 may occur in the library manager module 1318. In some embodiments, the library manager module 1318 may comprise the decomposition module 1110 from system 1100.

Host system 1306 may comprise host world module 1322. The host world module 1322 may manage the full 3D assets, the 3D virtual world, meshing of the real world, etc. and the integration between these. In some embodiments, the host world module 1322 may be considered a scenegraph, or the functional equivalent of a scenegraph. In some embodiments, the world can draw from items that come out of the world library (i.e. fully recomposed 3D model) and create world objects out of them. In some embodiments, everything in the 3D virtual world can be represented as a world object. The world object may be part of a world "class". In some embodiments, the host world module 1322 contains the same data as the client world module 1312, by step 1222 of process 1200 or by step 1011 of process 1000 (i.e. after the 3D models have been shared and recomposed locally at the client). The output from the host world module 1322 may feed into the render path module 1324.

Host system 1306 may comprise host render path module 1324. The render path module 1324 may accept as input data from the host world module 1322, put it through the host system 1306 render pipeline, and may display one or more 3D models on a display of the host system 1306.

Client system 1304 may comprise a client module 1308. The client module 1304 may manage functions and processes specific to being a client, such as transmission and networking and/or server/client protocols. The client module 1308 may manage the server discovery process and other connection protocols. In some embodiments, this may include steps 1216 and/or 1218 in process 1200. In some embodiments, the client module 1308 may comprise transmission module 1106.

Client system 1304 may comprise a client library manager module 1310. The library manager module 1310 may contain and manage the data and processes corresponding to 3D asset constituent parts that have been received from the 3D asset sharing host application. The library manager module 1310 may contain and manage the data and processes corresponding to the 3D asset sharing client application's libraries. This may include the recomposition process. In some embodiments, step 1220 from process 1200 may occur in the library manager module 1310. In some embodiments, step 1009 from process 1000 may occur in the library manager module 1310. In some embodiments, the library manager module 1310 may comprise the recomposition module 1104 from system 1100. In some embodiments, the client libraries contain the same data as the host libraries, by step 1222 of process 1200 or by step 1011 of process 1000 (i.e. after the 3D models have been shared and recomposed locally at the client).

Client system 1304 may comprise client world module 1312. The client world module 1312 may manage the fully recomposed 3D assets, the 3D virtual world, meshing of the real world, etc. and the integration between these. In some embodiments, the client world module 1312 may be considered a scenegraph, or the functional equivalent of a scenegraph. In some embodiments, the world draws from items that come out of a world library (i.e. fully recomposed 3D model) and creates world objects out of them. In some embodiments, everything in the 3D virtual world is represented as a world object. The world object may be part of a world "class". In some embodiments, the client world module 1312 can contain the same data as the host world module 1322, by step 1222 of process 1200 or by step 1011 of process 1000 (i.e. after the 3D models have been shared and recomposed locally at the client). The output from the client world module 1312 may feed into the render path module 1314.

Client system 1304 may comprise client render path module 1314. The render path module 1314 may accept as input data from the client world module 1312, put it through the client system 1304 render pipeline, and may display one or more virtual 3D models on a display of the client system 1304.

The example 3D model sharing system configuration 1300 can enable two or more devices to share full 3D models during runtime. This can have the advantage of adding new assets to an application on a computing system faster than traditional systems where the updates may need to wait until the application is closed.

Example Process for Decomposing a 3D Model

Figure 14:
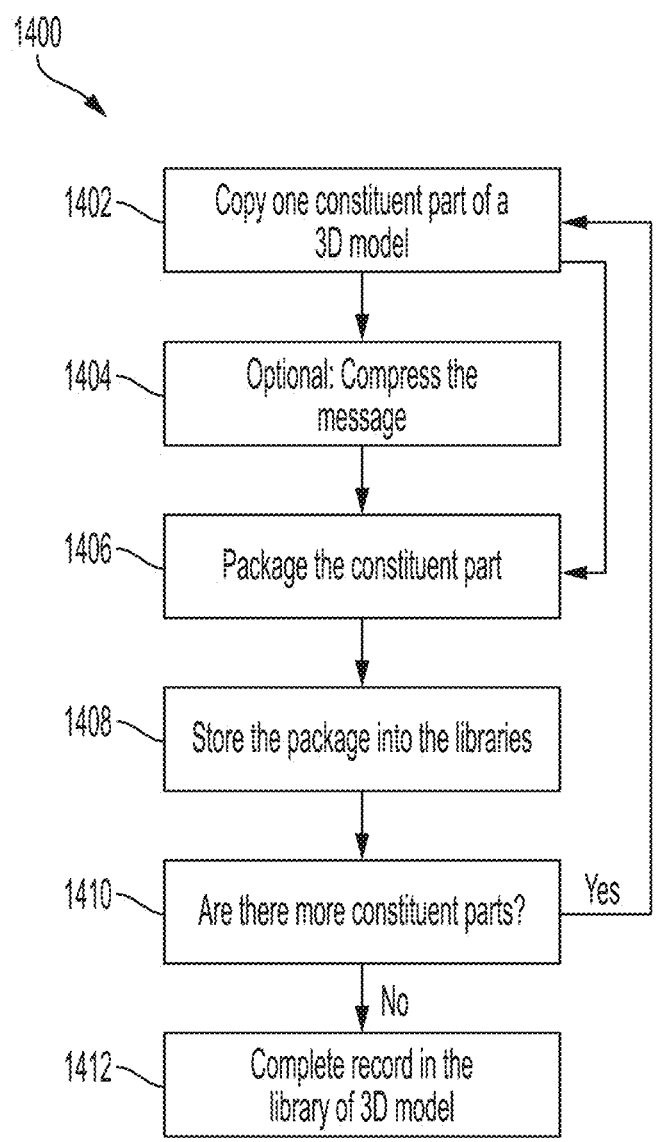
FIG. 14 illustrates an example process for decomposing a full 3D model using the system and methods described herein.

FIG. 14 illustrates an example process 1400 for decomposing a full 3D model using the system and methods described herein. In some embodiments, the decomposition process 1400 may occur in host library manager module 1318. In some embodiments, the decomposition process 1400 may occur in decomposition module 1110. In some embodiments, the decomposition process 1400 may be step 1003 in process 1000. In some embodiments, the decomposition process 1400 may be step 1206 in process 1200.

The process 1400 may start with a full 3D model that can be loaded within the 3D model sharing host application. At step 1402, the 3D model sharing host application may copy one constituent part of a 3D model and place the data representing the constituent part into an array. Some example constituent parts may be one or more vertex positions, vertex tables, geometric data, material data, textures, triangle index tables, etc. A constituent part may be a portion of the data required to represent a full 3D model.

At step 1404, the constituent part may optionally be compressed. Standard compression techniques may be used.

At step 1406, the constituent part may be packaged.

Figure 16:
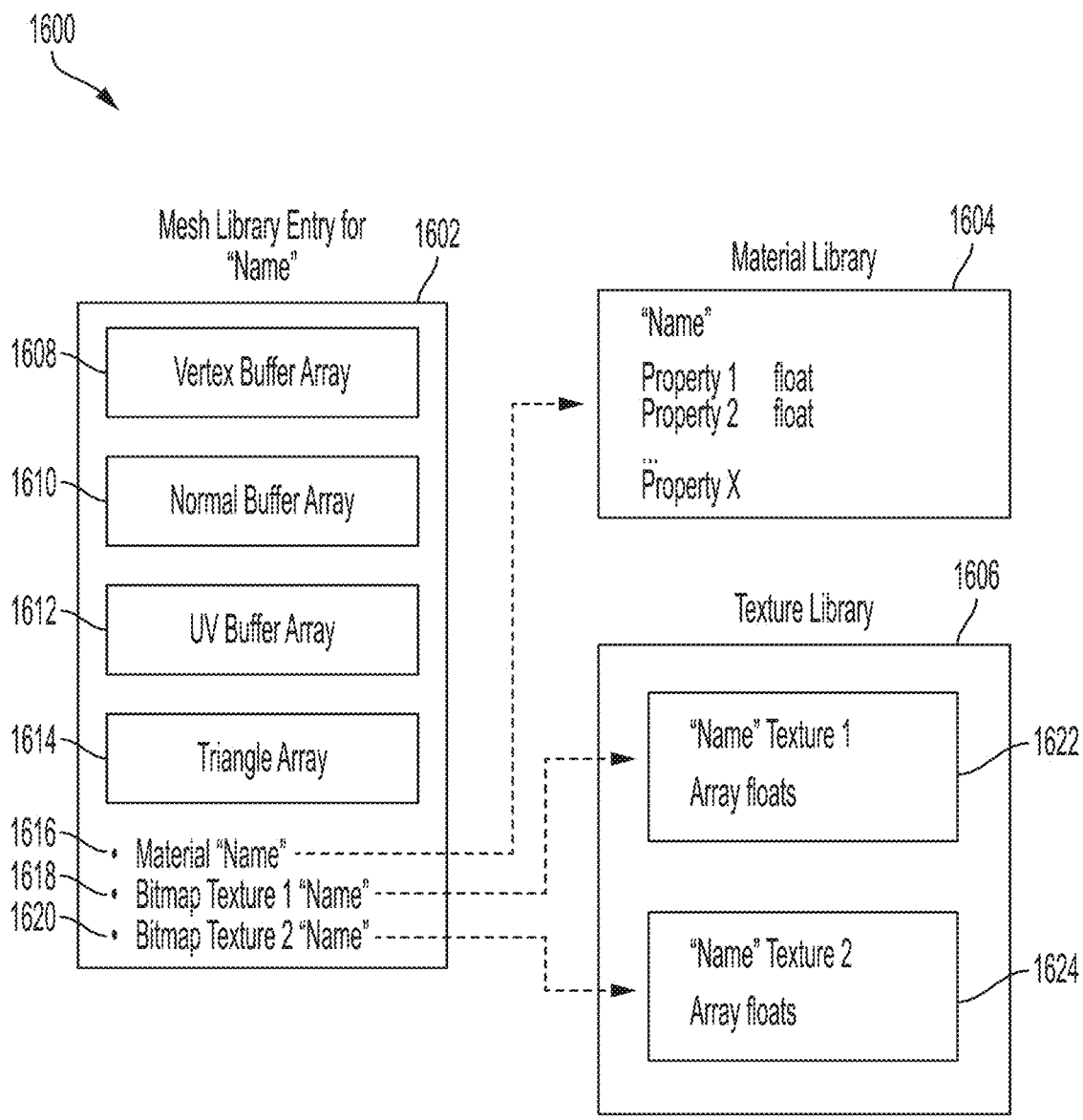
FIG. 16 illustrates an example set of libraries utilized in a 3D model sharing application to store constituent parts of a 3D model using the system and methods described herein.

At step 1408, the package may be stored in one of the 3D model sharing host application's libraries. The 3D model sharing host application may have one or more libraries used to store and organize the packages. In some embodiments, the library may comprise three libraries—a mesh library, a material library, and a texture library, as shown in FIG. 16. Alternate library configurations may be used. The package may be stored in the corresponding library (e.g. textures may be stored in the texture library).

At step 1410, the process may check the 3D model to see if there are additional constituent parts that need to be added to the library. If there are more constituent parts that have not been added to the library, the process can start over again at step 1402 until all constituent parts are added to the library. When all constituent parts have been added, the library may contain a complete record of the full 3D model, as in step 1412.

In some embodiments, a 3D model can be decomposed into constituent parts pre-defined by a 3D model application. For example, a 3D model application (e.g., a computer-aided design program) can define a 3D model in terms of different data elements (e.g., a mesh and a mesh renderer), each of which can comprise one or more defined constituent parts (e.g., a triangle array or a texture). Decomposing a 3D model in that case can constitute applying an operation (e.g., data formatting) to each constituent part and storing it in memory. In some embodiments, methods and systems described herein can be used to decompose a 3D model into one or more subgroups defined by a user. For example, for a 3D model of a car, a user can designate a collection of vertices/parts/structures as the "engine," a collection of vertices/parts/structures as the "chassis," a collection of vertices/parts/structures as the "drivetrain," and a collection of vertices/parts/structures as the "wheels." Each subgroup can then be optionally compressed and sent to a device separately. In some embodiments, a 3D model can be decomposed into algorithmically defined subgroups. For example, an algorithm can have been developed (e.g., manually, semi-automatically, and/or automatically, for example, through machine learning) to identify a collection of vertices/parts/structures as an "engine." An algorithm can first identify the whole 3D model (e.g., first identifying the model as a car) before attempting to classify a collection of vertices/parts/structures from a limited pool based on the initial identification. An algorithm can also directly attempt to classify a collection of vertices/parts/structures.

Example of a Full 3D Model

Figure 15:
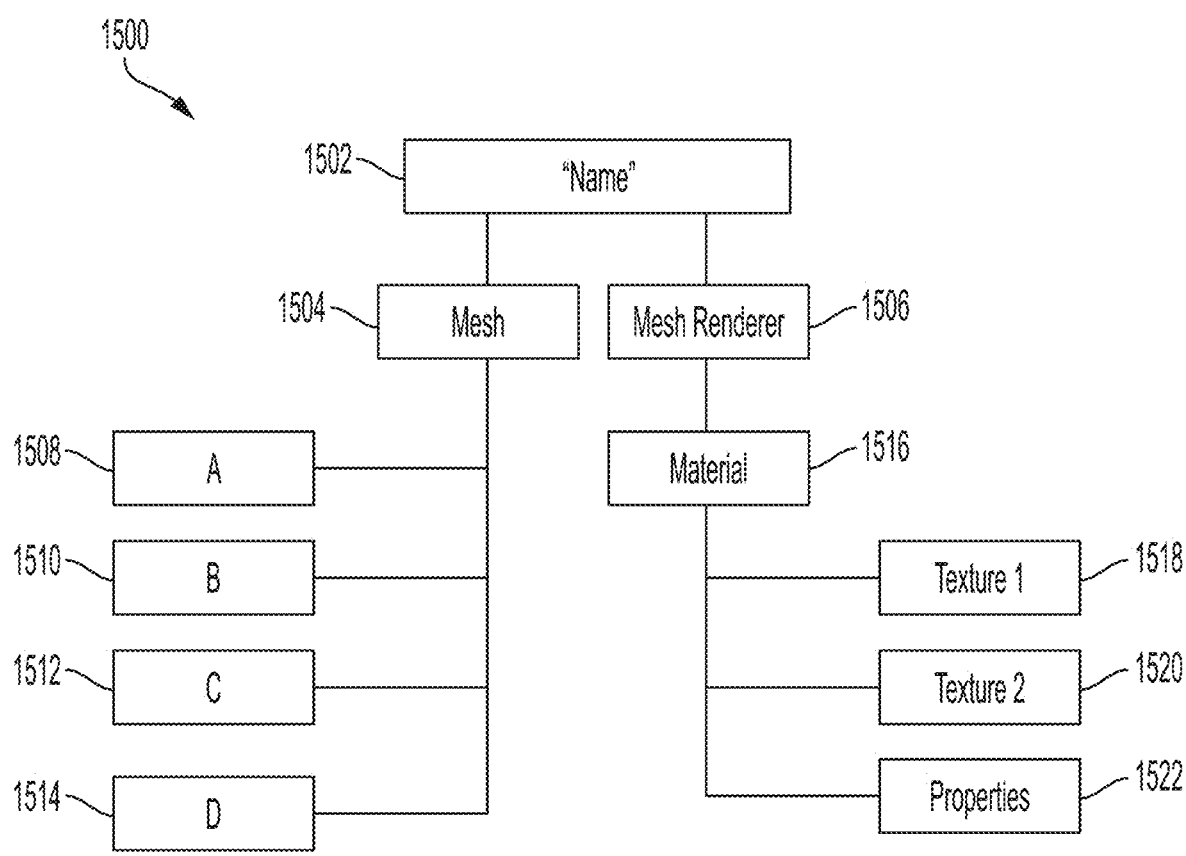
FIG. 15 illustrates an example full 3D model using the system and methods described herein.

FIG. 15 illustrates an example full 3D model 1500 using the system and methods described herein. In some embodiments, a full 3D model may be a complete set of data describing a 3D renderable digital object. In some embodiments, a full 3D model may be a set of data representing a digital or virtual object that is capable of display when added to a compatible render pipeline.

At 3D model component 1502, the 3D model can be assigned a name. The name may be assigned by the user, the import process, and/or may be the original file name used in the 3D model creation software, such as the file name given to a 3D model in AutoCad. The 3D model may have two main types of data: mesh data 1504 and mesh renderer data 1506. The mesh data may be broken down further into subsets of data, or constituent parts, such as constituent part A 1508, constituent part B 1510, constituent part 1512, and constituent part 1514. The material data 1516 may be broken down further into subsets of data, or constituent parts, such as material properties 1522, Texture 11518, and Texture 21522. The exact layout, categorization, and sub-grouping of 3D model data may vary from that shown in FIG. 15. In some embodiments, there may be any number of constituent parts under mesh 1504, such as two, three, or ten constituent parts. In some embodiments, there may be multiple subsets of properties 1522 under material data 1516, instead of just one. In some embodiments, there may be more or fewer Texture constituent parts 1518, 1520, than is shown in FIG. 15. Any suitable number and categorization may be used to break down a full 3D model into constituent parts.

In some embodiments, exemplary full 3D model 1500 can be decomposed using exemplary decomposition process 1400. Full 3D model 1500 can comprise one or more constituent parts (e.g., constituent part A 1508, constituent part B 1510, constituent part C 1512, constituent part D 1514, Texture 11518, Texture 21520, and/or material properties 1522). One constituent part of full 3D model 1500 (e.g., Texture 1) can be copied at step 1402 of decomposition process 1400. The constituent part can be optionally compressed at step 1404 of decomposition process 1400. The constituent part can be packaged at step 1406 of decomposition process 1400. The constituent part can be stored at step 1408 of decomposition process 1400 (e.g., in exemplary set of libraries 1600). Steps 1402, 1404, 1406, and 1408 can be repeated for each constituent part of full 3D model 1500 until all constituent parts of full 3D model 1500 have been stored (e.g., in set of libraries 1600).

Example of Libraries in a 3D Model Sharing Application

FIG. 16 illustrates an example set of libraries 1600 utilized in a 3D model sharing application to store constituent parts of a 3D model using the system and methods described herein. The set of libraries 1600 may comprise one or more libraries in order to store and organize the 3D model constituent parts. In some embodiments, there may be three libraries: a mesh library 1602, a material library 1604, and a texture library 1606. The mesh library 1602 may contain a set of constituent parts, in the form of arrays, that describe the 3D model mesh. Examples arrays that may be stored in the mesh library are a vertex buffer array 1608, a normal buffer array 1610, a UV buffer array 1612, and/or a triangle array 1614. The mesh library may optionally also contain one or more string values, such as Material "Name" 1616, Bitmap Texture 1 "Name" 1618, and Bitmap Texture 2 "Name" 1620. These string values 1616, 1618, 1620 may reference the other libraries, such as material library 1604 and texture library 1606. In some embodiments, a full 3D model may be represented when all of the data is pulled or referenced from the mesh library 1602. In some embodiments, a full 3D model for "Name" may be represented when all of the data is pulled or referenced from all of the libraries 1602, 1604, 1606 corresponding to a record, or single 3D model, "Name".

Material library 1604 may contain data representing properties of the material for a 3D model and the properties associated values. In some embodiments, texture library 1606 may contain one or more textures 1622, 1624. In some embodiments, texture library 1606 may contain one or more bitmaps. In some embodiments, texture library 1606 may contain one or more UV maps, UV coordinates, or other UV space data.

All of the data contained in libraries 1600 of the 3D sharing application may be combined to represent a full, renderable 3D model.

Example Process for Recomposing a 3D Model

Figure 17:
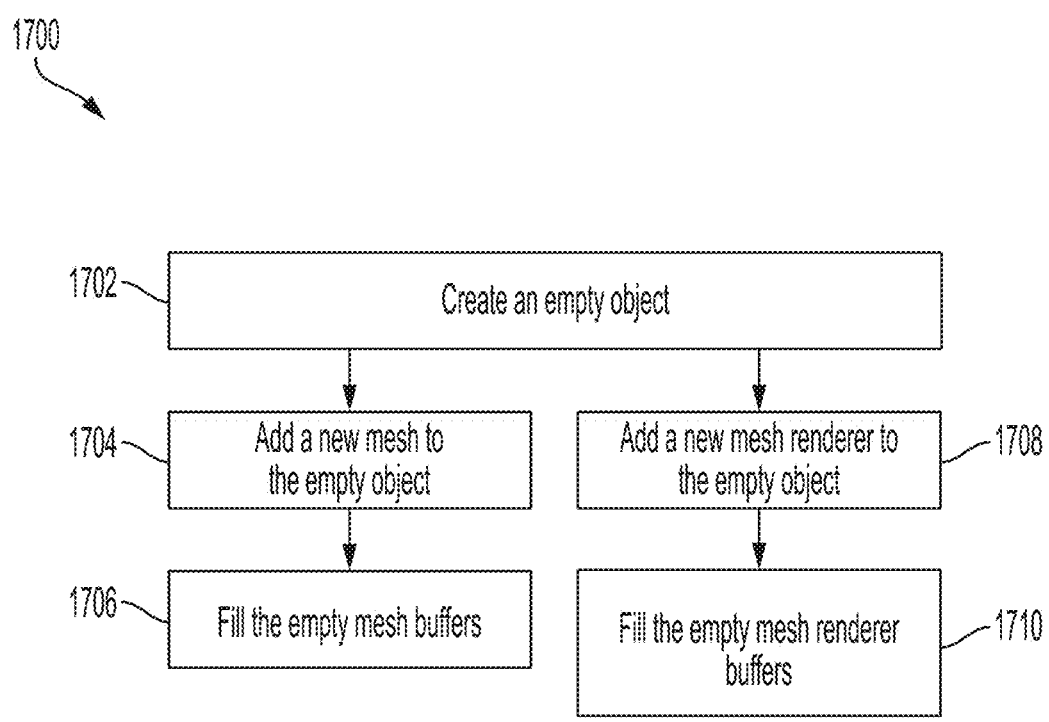
FIG. 17 illustrates an example process for recomposing a full 3D model from its constituent parts using the system and methods described herein.

FIG. 17 illustrates an example process 1700 for recomposing a full 3D model from its constituent parts using the system and methods described herein. In some embodiments, the process may be step 1220 in process 1200. In some embodiments, the process 1700 may be step 1009 from process 1000. In some embodiments, the process 1700 may occur in the recomposition module 1104. In some embodiments, the process 1700 may occur in library manager module 1310.

The process 1700 may begin at step 1702 by creating an empty object, sometimes called an empty game object. In some embodiments, the empty game object may comprise an empty volume in space with a reference coordinate system. In some embodiments, the empty object is essentially a transform that exists in space—a position and orientation. In some embodiments, the empty object is an empty prism. In some embodiments, the empty object may correspond to 1502 in FIG. 15.

After the empty object is created 1702, a new mesh 1704 and a new mesh renderer 1708 may be added to the empty game object. In some embodiments, adding a new mesh 1704 may correspond to mesh 1504 in FIG. 15 and adding a new mesh renderer 1708 may correspond to mesh renderer 1506 in FIG. 15.

The process 1700 may proceed to steps 1706 and 1710, where the empty mesh buffers can be filled with the 3D model constituent parts that correspond to mesh data and the empty mesh renderer buffers can be filled with the 3D model constituent parts that correspond to mesh render data. In some embodiments, steps 1706 and/or 1710 may un-compress compressed data. In some embodiments, the mesh data may correspond to constituent parts 1508, 1510, 1512, 1514 from FIG. 15. In some embodiments, the mesh render data may correspond to constituent parts 1518, 1520, 1522. The buffers may be filled with data from the 3D model application's libraries that correspond to a single 3D model. In some embodiments, the empty mesh buffers may be filled 1706 with data from mesh library 1602. In some embodiments, the empty mesh render buffers may be filled 1710 with data from material library 1604 and texture library 1606. The process 1700 can be complete when all of the data corresponding to a single 3D model (i.e. a single record within the 3D model sharing application's library) has been added to the empty object.

Figure 18:
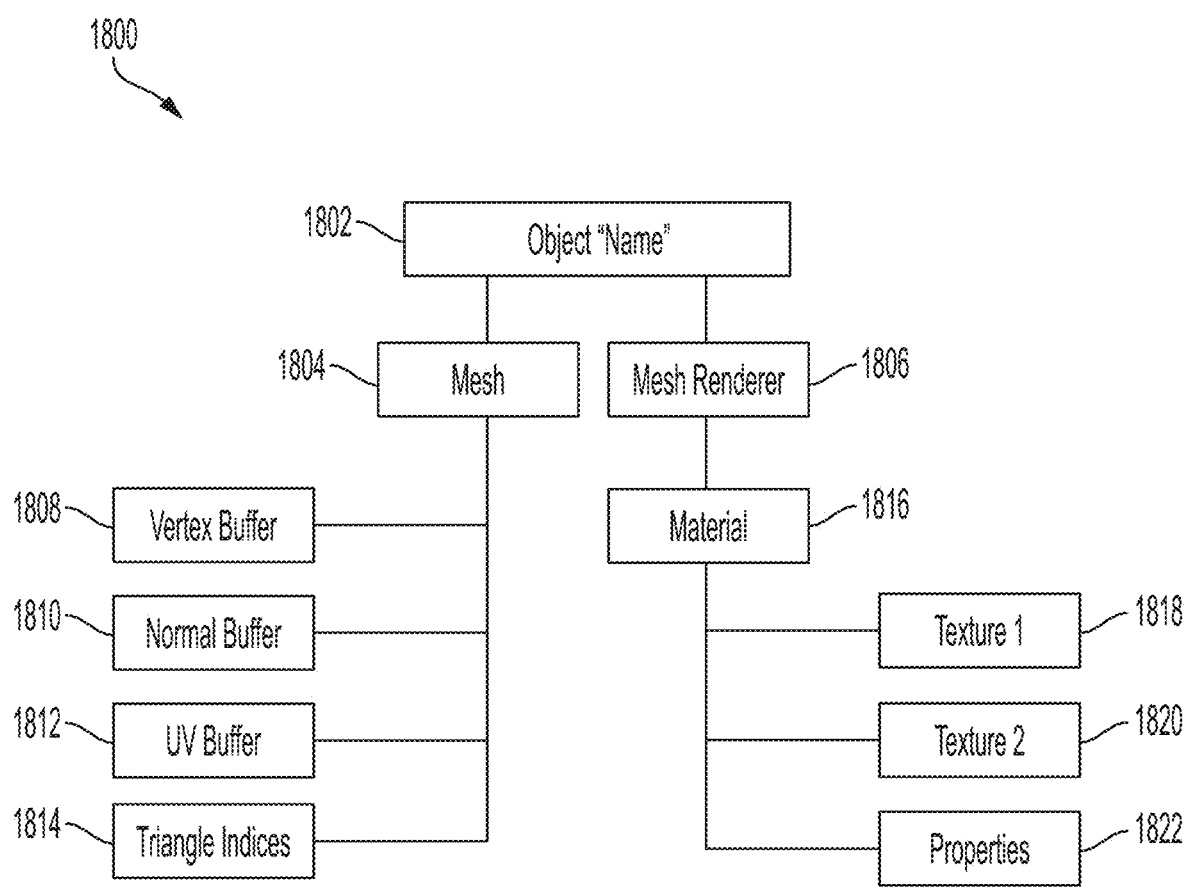
FIG. 18 illustrates an example full 3D model using the system and methods described herein.

FIG. 18 illustrates an example full 3D model 1800 using the system and methods described herein. In some embodiments, the full 3D model 1800 may be the output of process 1700. In some embodiments, the full 3D model 1800 can be a more detailed version of example full 3D model 1500, where generic constituent component A can be vertex buffer

1808, generic constituent component B can be normal buffer 1810, generic constituent component C can be UV buffer 1812, and generic constituent component D can be triangle indices 1814. In some embodiments, triangle indices 1814 may need to be filled in last.

In some embodiments, full 3D model 1800 may be the input to process 1400, from which the constituent parts are copied. In some embodiments, full 3D model 1800 may be stored in world module 1322 and/or 1312 as a world object. In some embodiments, full 3D model 1800 may be the 3D model loaded into the 3D model sharing server application in step 1204 of process 1200 and/or 1001 of process 1000. In some embodiments, full 3D model 1800 may be the output from step 1220 of process 1200 and/or step 1009 of process 1000. In some embodiments, full 3D model 1800 may be an asset stored in assets module 1102 and/or 1108. The Object "Name" 1802 may match the original file name that was loaded into the 3D model sharing application, car.fbx for example, even though the 3D model is no longer in FBX file format.

Other Examples of 3D Model Sharing

In some embodiments, a 3D model can originate from an MR device (e.g., wearable system 200). An MR device can capture information about a physical object, generate a 3D model of the physical object, decompose the 3D model into constituent parts, send constituent parts to a client device, and the client device can generate a 3D model based on constituent parts. For example, object recognizers 708 can receive input from outward facing imaging system 464, lidar sensors, depth sensors, RGB cameras, infrared cameras, time-of-flight cameras, and/or other sensors on an MR device. This input can be used in computer vision algorithms and/or machine-learning trained algorithms to generate a 3D model based on the physical object. An algorithm can generate a 3D model by first identifying a physical object and then generating a 3D model based on a library of 3D models associated with the physical object. In some embodiments, a 3D model can be generated from a physical object by assembling subgroups based on pre-defined subgroups in a library of 3D models. In some embodiments, a 3D model can be decomposed into subgroups defined by a user. In some embodiments, a 3D model can be decomposed into algorithmically defined subgroups. For example, an algorithm can have been developed (e.g., manually, semi-automatically, and/or automatically, for example, through machine learning) to identify a collection of vertices/parts/structures as a subgroup.

In some embodiments, an algorithm can also generate a 3D model directly from a physical object. For example, an algorithm can identify surfaces and vertices of a physical object and generate a 3D model of the whole physical object based on observed characteristics of the physical object. In some embodiments, an algorithm can identify localized surfaces and vertices of a physical object and generate a 3D model of a localized portion and/or define a subgroup of the physical object based on a library of subgroups. An algorithm can store data regarding the association of the subgroups to form a complete 3D model based on the constituent parts.

The 3D model sharing systems and methods described in the present disclosure can provide a specific solution to the technical problem of how to move a renderable 3D model from one computing system to a different computing system during runtime. This can present an improvement over existing technology which only adds new renderable 3D models to an application offline.

Although 3D models are discussed herein, it is also contemplated that systems and methods described in this application can apply to other digital assets other than 3D models. For example, 2D models can be decomposed, transferred, and reconstructed using systems and methods described herein (e.g., into outlines and textures). In some embodiments, an animation can be decomposed, transferred, and reconstructed using systems and methods described herein (e.g., into a series of meshes, which can each be decomposed further as described herein). In some embodiments, 3D models can be flattened into 2D models (e.g., to display on a 2D screen or to create a 2D map).

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Example Embodiments

1. A method comprising:
displaying a first version of a virtual three-dimensional model via a display of a head-wearable device, wherein the first version of the virtual three-dimensional model comprises a first version of a constituent part;
requesting data associated with a second version of the virtual three-dimensional model from a host device, wherein the second version of the virtual three-dimensional model comprises a second version of the constituent part;
determining whether the first version of the constituent part requires an update based on the second version of the constituent part;

in accordance with a determination that the first version of the constituent part requires an update based on the second version of the constituent part:
  requesting data associated with the second version of the constituent part from the host device;
  displaying the second version of the virtual three-dimensional model via the display of the head-wearable device; and
in accordance with a determination that the first version of the constituent part does not require an update based on the second version of the constituent part:
  forgoing requesting data associated with the second version of the constituent part from the host device.

2. The method of embodiment 1, wherein the constituent part comprises mesh data.

3. The method of embodiment 1, wherein the constituent part comprises texture data.

4. The method of embodiment 1, wherein the host device is a server.

5. The method of embodiment 1, wherein the head-wearable device is a first head-wearable device, and wherein the host device is a second head-wearable device.

6. The method of embodiment 1, the method further comprising storing the data associated with the second version of the constituent part in a memory.

7. The method of embodiment 1, the method further comprising decompressing the data associated with the second version of the constituent part.

8. A system comprising:
a head-wearable device comprising a display;
one or more processors configured to execute a method comprising:
  displaying a first version of a virtual three-dimensional model via the display, wherein the first version of the virtual three-dimensional model comprises a first version of a constituent part;
  requesting data associated with a second version of the virtual three-dimensional model from a host device, wherein the second version of the virtual three-dimensional model comprises a second version of the constituent part;
  determining whether the first version of the constituent part requires an update based on the second version of the constituent part;
  in accordance with a determination that the first version of the constituent part requires an update based on the second version of the constituent part:
    requesting data associated with the second version of the constituent part from the host device;
    displaying the second version of the virtual three-dimensional model via the display; and
  in accordance with a determination that the first version of the constituent part does not require an update based on the second version of the constituent part:
    forgoing requesting data associated with the second version of the constituent part from the host device.

9. The system of embodiment 8, wherein the constituent part comprises mesh data.

10. The system of embodiment 8, wherein the constituent part comprises texture data.

11. The system of embodiment 8, wherein the host device is a server.

12. The system of embodiment 8, wherein the head-wearable device is a first head-wearable device, and wherein the host device is a second head-wearable device.

13. The system of embodiment 8, the method further comprising storing the data associated with the second version of the constituent part in a memory.

14. The system of embodiment 8, the method further comprising decompressing the data associated with the second version of the constituent part.

15. A non-transitory computer-readable medium storing instructions that, when executed by one or more processors, cause the one or more processors to execute a method comprising:
displaying a first version of a virtual three-dimensional model via a display of a head-wearable device, wherein the first version of the virtual three-dimensional model comprises a first version of a constituent part;
requesting data associated with a second version of the virtual three-dimensional model from a host device, wherein the second version of the virtual three-dimensional model comprises a second version of the constituent part;
determining whether the first version of the constituent part requires an update based on the second version of the constituent part;
in accordance with a determination that the first version of the constituent part requires an update based on the second version of the constituent part:
  requesting data associated with the second version of the constituent part from the host device;
  displaying the second version of the virtual three-dimensional model via the display of the head-wearable device; and
in accordance with a determination that the first version of the constituent part does not require an update based on the second version of the constituent part:
  forgoing requesting data associated with the second version of the constituent part from the host device.

16. The non-transitory computer-readable medium of embodiment 15, wherein the constituent part comprises mesh data.

17. The non-transitory computer-readable medium of embodiment 15, wherein the constituent part comprises texture data.

18. The non-transitory computer-readable medium of embodiment 15, wherein the host device is a server.

19. The non-transitory computer-readable medium of embodiment 15, wherein the head-wearable device is a first head-wearable device, and wherein the host device is a second head-wearable device.

20. The non-transitory computer-readable medium of embodiment 15, the method further comprising storing the data associated with the second version of the constituent part in a memory.

21. The non-transitory computer-readable medium of embodiment 15, the method further comprising decompressing the data associated with the second version of the constituent part.

22. A method, the method comprising:
accessing a virtual three-dimensional model stored in a memory;
determining one or more constituent parts of the virtual three-dimensional model;
storing the one or more constituent parts in one or more arrays, wherein the one or more constituent parts are stored separate from the virtual three-dimensional model;
receiving a connection request from a head-wearable device;
sending a list of available constituent parts to the head-wearable device;
receiving a constituent part request from the head-wearable device; and sending the head-wearable device a requested constituent part based on the constituent part request.

23. The method of embodiment 22, wherein the constituent part comprises mesh data.

24. The method of embodiment 22, wherein the constituent part comprises texture data.

25. The method of embodiment 22, the method further comprising compressing the one or more constituent parts.

26. The method of embodiment 22, wherein the virtual three-dimensional model is a first virtual three-dimensional model, and wherein the method further comprises generating a copy of the virtual three-dimensional model based on the requested constituent part.

27. The method of embodiment 22, the method further comprising displaying the requested constituent part via a display of the head-wearable device.

28. The method of embodiment 22, the method further comprising:
creating a placeholder for a new virtual three-dimensional model; and
updating the placeholder for the new virtual three-dimensional model based on the requested constituent part.

29. A system, the system comprising:
a head-wearable device;
one or more processors configured to execute a method comprising:
accessing a virtual three-dimensional model stored in a memory;
determining one or more constituent parts of the virtual three-dimensional model;
storing the one or more constituent parts in one or more arrays, wherein the one or more constituent parts are stored separate from the virtual three-dimensional model;
receiving a connection request from a head-wearable device;
sending a list of available constituent parts to the head-wearable device;
receiving a constituent part request from the head-wearable device; and
sending the head-wearable device a requested constituent part based on the constituent part request.

30. The system of embodiment 29, wherein the constituent part comprises mesh data.

31. The system of embodiment 29, wherein the constituent part comprises texture data.

32. The system of embodiment 29, the method further comprising compressing the one or more constituent parts.

33. The system of embodiment 29, wherein the virtual three-dimensional model is a first virtual three-dimensional model, and wherein the method further comprises generating a copy of the virtual three-dimensional model based on the requested constituent part.

34. The system of embodiment 29, the method further comprising displaying the requested constituent part via a display of the head-wearable device.

35. The system of embodiment 29, the method further comprising:
creating a placeholder for a new virtual three-dimensional model; and
updating the placeholder for the new virtual three-dimensional model based on the requested constituent part.

36. A non-transitory computer-readable medium storing instructions that, when executed by one or more processors, cause the one or more processors to execute a method comprising:
accessing a virtual three-dimensional model stored in a memory;
determining one or more constituent parts of the virtual three-dimensional model;
storing the one or more constituent parts in one or more arrays, wherein the one or more constituent parts are stored separate from the virtual three-dimensional model;
receiving a connection request from a head-wearable device;
sending a list of available constituent parts to the head-wearable device;
receiving a constituent part request from the head-wearable device; and
sending the head-wearable device a requested constituent part based on the constituent part request.

37. The non-transitory computer-readable medium of embodiment 36, wherein the constituent part comprises mesh data.

38. The non-transitory computer-readable medium of embodiment 36, wherein the constituent part comprises texture data.

39. The non-transitory computer-readable medium of embodiment 36, the method further comprising compressing the one or more constituent parts.

40. The non-transitory computer-readable medium of embodiment 36, wherein the virtual three-dimensional model is a first virtual three-dimensional model, and wherein the method further comprises generating a copy of the virtual three-dimensional model based on the requested constituent part.

41. The non-transitory computer-readable medium of embodiment 36, the method further comprising displaying the requested constituent part via a display of the head-wearable device.

42. The non-transitory computer-readable medium of embodiment 36, the method further comprising:
creating a placeholder for a new virtual three-dimensional model; and
updating the placeholder for the new virtual three-dimensional model based on the requested constituent part.

43. A system comprising:
a host computing system;
a client computing system comprising a head-wearable display system;
wherein the host computing system comprises one or more processors configured to execute a method comprising:
accessing a virtual three-dimensional model stored in a memory;
decomposing the three-dimensional model into one or more constituent parts;
sending a list of the one or more constituent parts to the client computing system;
receiving a constituent part request from the client computing system;
sending one or more constituent parts that correspond to the constituent part request to the client computing system; and
wherein the client computing system comprises one or more processors configured to execute a method comprising:
receiving the list of the one or more constituent parts from the host computing system;

sending the constituent part request to the host computing system;

receiving the one or more of the constituent parts that correspond to the constituent part request from the host computing system;

composing a copy of the virtual three-dimensional model from the one or more of the constituent parts that correspond to the constituent part request.

44. The system of embodiment 43, wherein the constituent part comprises mesh data.

45. The system of embodiment 43, wherein the constituent part comprises texture data.

46. The system of embodiment 43, wherein the host computing system is a server.

47. The system of embodiment 43, wherein the host computing system comprises a head-wearable display system.

48. The system of embodiment 43, the method further comprising storing the one or more constituent parts in a memory.

49. The system of embodiment 43, the method further comprising decompressing the one or more constituent parts.

50. A method comprising:

accessing a virtual three-dimensional model stored in a memory;

decomposing the three-dimensional model into one or more constituent parts;

sending a list of the one or more constituent parts to a client computing system comprising a head-wearable display;

receiving a constituent part request from the client computing system;

sending one or more constituent parts that correspond to the constituent part request to the client computing system;

receiving the list of the one or more constituent parts from a host computing system;

sending the constituent part request to the host computing system;

receiving the one or more of the constituent parts that correspond to the constituent part request from the host computing system; and composing a copy of the virtual three-dimensional model from the one or more of the constituent parts that correspond to the constituent part request.

51. The method of embodiment 50, wherein the constituent part comprises mesh data.

52. The method of embodiment 50, wherein the constituent part comprises texture data.

53. The method of embodiment 50, wherein the host computing system is a server.

54. The method of embodiment 50, wherein the host computing system comprises a head-wearable display system.

55. The method of embodiment 50, the method further comprising storing the one or more constituent parts in a memory.

56. The method of embodiment 50, the method further comprising decompressing the one or more constituent parts.

57. A non-transitory computer-readable medium storing one or more instructions, which, when executed by one or more processors, cause the one or more processors to perform a method comprising:

accessing a virtual three-dimensional model stored in a memory;

decomposing the three-dimensional model into one or more constituent parts;

sending a list of the one or more constituent parts to a client computing system comprising a head-wearable display;

receiving a constituent part request from the client computing system;

sending one or more constituent parts that correspond to the constituent part request to the client computing system;

receiving the list of the one or more constituent parts from a host computing system;

sending the constituent part request to the host computing system;

receiving the one or more of the constituent parts that correspond to the constituent part request from the host computing system; and composing a copy of the virtual three-dimensional model from the one or more of the constituent parts that correspond to the constituent part request.

58. The non-transitory computer-readable medium of embodiment 57, wherein the constituent part comprises mesh data.

59. The non-transitory computer-readable medium of embodiment 57, wherein the constituent part comprises texture data.

60. The non-transitory computer-readable medium of embodiment 57, wherein the host computing system is a server.

61. The non-transitory computer-readable medium of embodiment 57, wherein the host computing system comprises a head-wearable display system.

62. The non-transitory computer-readable medium of embodiment 57, the method further comprising storing the one or more constituent parts in a memory.

63. The non-transitory computer-readable medium of embodiment 57, the method further comprising decompressing the one or more constituent parts.

64. A system comprising:

a host computing system, wherein the host computing system comprises one or more processors configured to execute a method comprising:

accessing a first virtual three-dimensional model via a host assets module;

identifying one or more constituent parts via a decomposition module;

copying the one or more constituent parts to a library via the decomposition module;

accessing the one or more constituent parts via a host transmission module;

sending the one or more constituent parts to a client computing system via the host transmission module; and the client computing system, wherein the client computing system comprises a head-wearable display system, and wherein the client computing system comprises one or more processors configured to execute a method comprising:

receiving the one or more constituent parts from the host computing system via a client transmission module;

creating an empty object via a composition module;

adding one or more data types to the empty object via the composition module;

adding one or more constituent parts to the empty object via the composition module;

storing a copy of the virtual three-dimensional model via a client assets module; and wherein the host computing system and client computing system are communicably connected via a communication link.

65. The system of embodiment 64, wherein the constituent part comprises mesh data.

66. The system of embodiment 64, wherein the constituent part comprises texture data.

67. The system of embodiment 64, wherein the host computing system is a server.

68. The system of embodiment 64, wherein the host computing system comprises a head-wearable display system.

69. The system of embodiment 64, the method further comprising storing the one or more constituent parts in a memory.

70. The system of embodiment 64, the method further comprising decompressing the one or more constituent parts.

71. A method comprising:

at a host computing system, wherein the host computing system comprises one or more processors configured to execute a method comprising:

accessing a first virtual three-dimensional model via a host assets module;

identifying one or more constituent parts via a decomposition module;

copying the one or more constituent parts to a library via the decomposition module;

accessing the one or more constituent parts via a host transmission module;

sending the one or more constituent parts to a client computing system via the host transmission module; and at the client computing system, wherein the client computing system comprises a head-wearable display system, and wherein the client computing system comprises one or more processors configured to execute a method comprising:

receiving the one or more constituent parts from the host computing system via a client transmission module;

creating an empty object via a composition module;

adding one or more data types to the empty object via the composition module;

adding one or more constituent parts to the empty object via the composition module;

storing a copy of the virtual three-dimensional model via a client assets module; and wherein the host computing system and client computing system are communicably connected via a communication link.

72. The method of embodiment 71, wherein the constituent part comprises mesh data.

73. The method of embodiment 71, wherein the constituent part comprises texture data.

74. The method of embodiment 71, wherein the host computing system is a server.

75. The method of embodiment 71, wherein the host computing system comprises a head-wearable display system.

76. The method of embodiment 71, the method further comprising storing the one or more constituent parts in a memory.

77. The method of embodiment 71, the method further comprising decompressing the one or more constituent parts.

78. A non-transitory computer-readable medium storing one or more instructions, which, when executed by one or more processors, cause the processors to perform a method comprising:

at a host computing system:

accessing a first virtual three-dimensional model via a host assets module;

identifying one or more constituent parts via a decomposition module;

copying the one or more constituent parts to a library via the decomposition module;

accessing the one or more constituent parts via a host transmission module;

sending the one or more constituent parts to a client computing system via the host transmission module; and at the client computing system, wherein the client computing system comprises a head-wearable display system:

receiving the one or more constituent parts from the host computing system via a client transmission module;

creating an empty object via a composition module;

adding one or more data types to the empty object via the composition module;

adding one or more constituent parts to the empty object via the composition module;

storing a copy of the virtual three-dimensional model via a client assets module; and wherein the host computing system and client computing system are communicably connected via a communication link.

79. The non-transitory computer-readable medium of embodiment 78, wherein the constituent part comprises mesh data.

80. The non-transitory computer-readable medium of embodiment 78, wherein the constituent part comprises texture data.

81. The non-transitory computer-readable medium of embodiment 78, wherein the host computing system is a server.

82. The non-transitory computer-readable medium of embodiment 78, wherein the host computing system comprises a head-wearable display system.

83. The non-transitory computer-readable medium of embodiment 78, the method further comprising storing the one or more constituent parts in a memory.

84. The non-transitory computer-readable medium of embodiment 78, the method further comprising decompressing the one or more constituent parts.

85. A system comprising:

a host computing system, wherein the host computing system comprises one or more processors configured to execute a method comprising:

accessing a first virtual three-dimensional model via a load module;

identifying one or more constituent parts via the host library manager module;

copying the one or more constituent parts to a library via the host library manager module;

storing the first virtual three-dimensional model via a host world module;

rendering the first virtual three-dimensional model via a host render path module;

accessing the one or more constituent parts via a server module;

sending the one or more constituent parts to a client computing system via the server module; and the client computing system, wherein the client computing system comprises a head-wearable display system, and wherein the client computing system comprises one or more processors configured to execute a method comprising:

receiving the one or more constituent parts from the host computing system via a client module;

generating a copy of the virtual three-dimensional model, wherein generating the copy of the virtual three-dimensional model comprises:

creating an empty object via a client library manager module; and adding one or more constituent parts to the empty object via the client library manager module;

storing the copy of the virtual three-dimensional model via a client world module;

rendering the copy of the virtual three-dimensional model via a client render path module;

wherein the host computing system and client computing system are communicably connected via a communication link.

86. The system of embodiment 85, wherein the constituent part comprises mesh data.

87. The system of embodiment 85, wherein the constituent part comprises texture data.

88. The system of embodiment 85, wherein the host computing system is a server.

89. The system of embodiment 85, wherein the host computing system comprises a head-wearable display system.

90. The system of embodiment 85, the method further comprising storing the one or more constituent parts in a memory.

91. The system of embodiment 85, the method further comprising decompressing the one or more constituent parts.

92. A method comprising:

at a host computing system:

accessing a first virtual three-dimensional model via a load module;

identifying one or more constituent parts via the host library manager module;

copying the one or more constituent parts to a library via the host library manager module;

storing the first virtual three-dimensional model via a host world module;

rendering the first virtual three-dimensional model via a host render path module;

accessing the one or more constituent parts via a server module;

sending the one or more constituent parts to a client computing system via the server module; and at the client computing system, wherein the client computing system comprises a head-wearable display system:

receiving the one or more constituent parts from the host computing system via a client module;

generating a copy of the virtual three-dimensional model, wherein generating the copy of the virtual three-dimensional model comprises:

creating an empty object via a client library manager module; and adding one or more constituent parts to the empty object via the client library manager module;

storing the copy of the virtual three-dimensional model via a client world module;

rendering the copy of the virtual three-dimensional model via a client render path module;

wherein the host computing system and client computing system are communicably connected via a communication link.

93. The method of embodiment 92, wherein the constituent part comprises mesh data.

94. The method of embodiment 92, wherein the constituent part comprises texture data.

95. The method of embodiment 92, wherein the host computing system is a server.

96. The method of embodiment 92, wherein the host computing system comprises a head-wearable display system.

97. The method of embodiment 92, the method further comprising storing the one or more constituent parts in a memory.

98. The method of embodiment 92, the method further comprising decompressing the one or more constituent parts.

99. A non-transitory computer-readable medium storing one or more instructions, which, when executed by one or more processors, cause the one or more processors to perform a method comprising:

a host computing system, wherein the host computing system comprises one or more processors configured to execute a method comprising:

accessing a first virtual three-dimensional model via a load module;

identifying one or more constituent parts via the host library manager module;

copying the one or more constituent parts to a library via the host library manager module;

storing the first virtual three-dimensional model via a host world module;

rendering the first virtual three-dimensional model via a host render path module;

accessing the one or more constituent parts via a server module;

sending the one or more constituent parts to a client computing system via the server module; and the client computing system, wherein the client computing system comprises a head-wearable display system, and wherein the client computing system comprises one or more processors configured to execute a method comprising:

receiving the one or more constituent parts from the host computing system via a client module;

generating a copy of the virtual three-dimensional model, wherein generating the copy of the virtual three-dimensional model comprises:

creating an empty object via a client library manager module; and adding one or more constituent parts to the empty object via the client library manager module;

storing the copy of the virtual three-dimensional model via a client world module;

rendering the copy of the virtual three-dimensional model via a client render path module;

wherein the host computing system and client computing system are communicably connected via a communication link.

100. The non-transitory computer-readable medium of embodiment 99, wherein the constituent part comprises mesh data.

101. The non-transitory computer-readable medium of embodiment 99, wherein the constituent part comprises texture data.

103. The non-transitory computer-readable medium of embodiment 99, wherein the host computing system is a server.

104. The non-transitory computer-readable medium of embodiment 99, wherein the host computing system comprises a head-wearable display system.

105. The non-transitory computer-readable medium of embodiment 99, the method further comprising storing the one or more constituent parts in a memory.

106. The non-transitory computer-readable medium of embodiment 99, the method further comprising decompressing the one or more constituent parts.

107. A system comprising:
a non-transitory computer-readable memory storing a three-dimensional model comprising one or more constituent parts, and
a host computing system comprising one or more processors configured to access, from the non-transitory computer-readable memory, the three-dimensional model, and further configured execute a method comprising:
storing one of the one or more constituent parts of the three-dimensional model into an array stored in the non-transitory computer-readable memory,
packaging the array into a package in a library of the host computing system.

108. The system of embodiment 107, wherein the constituent part comprises mesh data.

109. The system of embodiment 107, wherein the constituent part comprises texture data.

110. The system of embodiment 107, wherein the host computing system is a server.

111. The system of embodiment 107, wherein the host computing system comprises a head-wearable display system.

112. The system of embodiment 107, the method further comprising storing the one or more constituent parts in a memory.

113. The system of embodiment 107, the method further comprising decompressing the one or more constituent parts.

114. A method comprising:
storing, via a non-transitory computer-readable memory, a three-dimensional model comprising one or more constituent parts;
accessing, from the non-transitory computer-readable memory, the three-dimensional model;
storing one of the one or more constituent parts of the three-dimensional model into an array stored in the non-transitory computer-readable memory,
packaging the array into a package in a library of the host computing system.

115. The method of embodiment 114, wherein the constituent part comprises mesh data.

116. The method of embodiment 114, wherein the constituent part comprises texture data.

117. The method of embodiment 114, wherein the non-transitory computer-readable memory is part of a server.

118. The method of embodiment 114, wherein the non-transitory computer-readable memory is part of a head-wearable display system.

119. The method of embodiment 114, the method further comprising storing the one or more constituent parts in a memory.

120. The method of embodiment 114, the method further comprising decompressing the one or more constituent parts.

121. A non-transitory computer-readable medium storing one or more instructions, which, when executed by one or more processors, cause the one or more processors to perform a method comprising:
storing, via a non-transitory computer-readable memory, a three-dimensional model comprising one or more constituent parts;
accessing, from the non-transitory computer-readable memory, the three-dimensional model;
storing one of the one or more constituent parts of the three-dimensional model into an array stored in the non-transitory computer-readable memory,
packaging the array into a package in a library of the host computing system.

122. The non-transitory computer-readable medium of embodiment 121, wherein the constituent part comprises mesh data.

123. The non-transitory computer-readable medium of embodiment 121, wherein the constituent part comprises texture data.

124. The non-transitory computer-readable medium of embodiment 121, wherein the non-transitory computer-readable memory is part of a server.

125. The non-transitory computer-readable medium of embodiment 121, wherein the non-transitory computer-readable memory is part of a head-wearable display system.

126. The non-transitory computer-readable medium of embodiment 121, the method further comprising storing the one or more constituent parts in a memory.

127. The non-transitory computer-readable medium of embodiment 121, the method further comprising decompressing the one or more constituent parts.

Examples of constituent parts may be geometric data, material data, vertex tables, one or more textures, triangle indices, or any other data used to ultimately define a full representation of a 3D model.

The invention claimed is:
1. A system comprising:
a host computing system; and
a client computing system comprising a head-wearable display system,
wherein the host computing system comprises one or more processors configured to execute a method comprising:
accessing a virtual three-dimensional model stored in a memory;
decomposing the virtual three-dimensional model into one or more constituent parts, wherein the one or more constituent parts comprises a group of constituent parts comprising mesh data, texture data, or a combination thereof;
determining whether the client computing system is connected to the host computing system;
in accordance with a determination that the client computing system is connected to the host computing system, sending, to the client computing system, a library comprising the one or more constituent parts, the library corresponding to the virtual three-dimensional model;
receiving a constituent part request from the client computing system; and
sending one or more constituent parts that correspond to the constituent part request to the client computing system;
wherein the client computing system comprises one or more processors configured to execute a method comprising:
receiving the library of the one or more constituent parts from the host computing system;
determining a requested part to be included in the constituent part request based on a comparison of the library of the one or more constituent parts and a client library of constituent parts;
sending the constituent part request to the host computing system;

receiving the one or more of the constituent parts that correspond to the constituent part request from the host computing system; and composing a copy of the virtual three-dimensional model from the received one or more constituent parts.

2. The system of claim 1, wherein the host computing system comprises a server.

3. The system of claim 1, wherein the host computing system comprises a head-wearable display system.

4. The system of claim 1, the method further comprising storing the one or more constituent parts in a memory.

5. The system of claim 1, the method further comprising decompressing the one or more constituent parts.

6. A method comprising:

accessing a virtual three-dimensional model stored in a memory;

decomposing the virtual three-dimensional model into one or more constituent parts, wherein the one or more constituent parts comprises a group of constituent parts comprising mesh data, texture data, or a combination thereof;

determining whether a client computing system is connected to a host computing system;

in accordance with a determination that the client computing system is connected to the host computing system, sending, to the client computing system comprising a head-wearable display, a library comprising the one or more constituent parts, the library corresponding to the virtual three-dimensional model;

receiving a constituent part request from the client computing system;

sending one or more constituent parts that correspond to the constituent part request to the client computing system;

receiving the library of the one or more constituent parts from the host computing system;

determining a requested part to be included in the constituent part request based on a comparison of the library of the one or more constituent parts and a client library of constituent parts;

sending the constituent part request to the host computing system;

receiving the one or more of the constituent parts that correspond to the constituent part request from the host computing system; and composing a copy of the virtual three-dimensional model from the received one or more constituent parts.

7. The method of claim 6, wherein the host computing system comprises a server.

8. The method of claim 6, wherein the host computing system comprises a head-wearable display system.

9. The method of claim 6, the method further comprising storing the one or more constituent parts in a memory.

10. The method of claim 6, the method further comprising decompressing the one or more constituent parts.

11. A non-transitory computer-readable medium storing one or more instructions, which, when executed by one or more processors, cause the one or more processors to perform a method comprising:

accessing a virtual three-dimensional model stored in a memory;

decomposing the virtual three-dimensional model into one or more constituent parts, wherein the one or more constituent parts comprises a group of constituent parts comprising mesh data, texture data, or a combination thereof;

determining whether a client computing system is connected to a host computing system;

in accordance with a determination that the client computing system is connected to the host computing system, sending, to the client computing system comprising a head-wearable display, a library comprising the one or more constituent parts, the library corresponding to the virtual three-dimensional model;

receiving a constituent part request from the client computing system;

sending one or more constituent parts that correspond to the constituent part request to the client computing system;

receiving the library of the one or more constituent parts from the host computing system;

determining a requested part to be included in the constituent part request based on a comparison of the library of the one or more constituent parts and a client library of constituent parts;

sending the constituent part request to the host computing system;

receiving the one or more of the constituent parts that correspond to the constituent part request from the host computing system; and composing a copy of the virtual three-dimensional model from the received one or more constituent parts.

12. The non-transitory computer-readable medium of claim 11, wherein the host computing system comprises a server.

13. The non-transitory computer-readable medium of claim 11, wherein the host computing system comprises a head-wearable display system.

14. The non-transitory computer-readable medium of claim 11, the method further comprising storing the one or more constituent parts in a memory.

15. The non-transitory computer-readable medium of claim 11, the method further comprising decompressing the one or more constituent parts.

\* \* \* \* \*